United States Patent
Weiss

(10) Patent No.: US 11,017,410 B2
(45) Date of Patent: May 25, 2021

(54) METHODS AND SYSTEMS FOR MANAGING AND TRADING USING A SHARED ORDER BOOK AS INTERNAL EXCHANGE

(75) Inventor: David Weiss, New York, NY (US)

(73) Assignee: CFPH, LLC, New York, NY (US)

( * ) Notice: Subject to any disclaimer, the term of this patent is extended or adjusted under 35 U.S.C. 154(b) by 2962 days.

(21) Appl. No.: 11/967,696

(22) Filed: Dec. 31, 2007

(65) Prior Publication Data

US 2008/0177652 A1   Jul. 24, 2008

Related U.S. Application Data

(60) Provisional application No. 60/882,905, filed on Dec. 30, 2006.

(51) Int. Cl.
*G06Q 30/00* (2012.01)
*G06Q 30/02* (2012.01)
(Continued)

(52) U.S. Cl.
CPC ......... *G06Q 30/02* (2013.01); *G06Q 30/0601* (2013.01); *G06Q 40/04* (2013.01); *G06Q 40/12* (2013.12)

(58) Field of Classification Search
CPC ........ G06Q 30/00; G06Q 30/02; G06Q 30/06; G06Q 30/08; G06Q 30/0601; G06Q 30/0641; G06Q 40/04; G06Q 40/12
(Continued)

(56) References Cited

U.S. PATENT DOCUMENTS

| | | | |
|---|---|---|---|
| 3,573,747 | A | 4/1971 | Adams et al. |
| 3,581,072 | A | 5/1971 | Nymeyer |

(Continued)

FOREIGN PATENT DOCUMENTS

| | | |
|---|---|---|
| EP | 0388162 | 3/1990 |
| EP | 1081614 A2 | 3/2001 |

(Continued)

OTHER PUBLICATIONS

International Search Report and Written Opinion for International Application No. PCT/US07/89210, dated May 6, 2008 (7 pages).

(Continued)

*Primary Examiner* — Hani M Kazimi

(57) ABSTRACT

Methods and corresponding system are herewith provided that, in certain embodiments, include the steps or steps of receiving a plurality of orders for an item from computing devices associated with a plurality of internal users; receiving a plurality of orders for the item from computing devices associated with a plurality of external users; determining a best bid and a best offer from the plurality of the orders from the plurality of internal users and the plurality of the external orders; and causing an interface screen to be displayed at a user computing device, the interface screen comprising a shared order book for the item that comprises a listing of the orders from the plurality of internal users and the plurality of external users sorted based at least by price, the shared order book arranged in a set of bid side columns and a set of ask side columns, each of the set of columns comprising at least one price column and at least one size column, and at least one column indicating a source of at least one of each of an order from an internal user and an order for an external user.

9 Claims, 17 Drawing Sheets

(51) Int. Cl.
*G06Q 30/06* (2012.01)
*G06Q 40/04* (2012.01)
*G06Q 40/00* (2012.01)

(58) Field of Classification Search
USPC .................................................. 705/35–37
See application file for complete search history.

(56) References Cited

U.S. PATENT DOCUMENTS

| | | | |
|---|---|---|---|
| 4,412,287 A | 10/1983 | Braddock, III | |
| 4,674,044 A | 6/1987 | Kalmus et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,297,031 A | 3/1994 | Gutterman et al. | |
| 5,305,200 A | 4/1994 | Hartheimer et al. | |
| 5,375,055 A | 12/1994 | Togher et al. | |
| 5,710,887 A | 1/1998 | Chelliah et al. | |
| 5,717,989 A | 2/1998 | Tozzoli et al. | |
| 5,727,165 A | 3/1998 | Ordish et al. | |
| 5,787,402 A | 7/1998 | Potter et al. | |
| 5,794,207 A | 8/1998 | Walker et al. | |
| 5,873,071 A | 2/1999 | Ferstenberg et al. | |
| 5,878,139 A | 3/1999 | Rosen | |
| 5,915,245 A | 6/1999 | Patterson, Jr. et al. | |
| 5,924,083 A | 7/1999 | Silverman et al. | |
| 5,930,762 A | 7/1999 | Masch | |
| 5,950,177 A | 9/1999 | Lupien et al. | |
| 5,970,479 A | 10/1999 | Shepherd | |
| 6,012,046 A | 1/2000 | Lupien et al. | |
| 6,014,643 A | 1/2000 | Minton | |
| 6,029,146 A | 2/2000 | Hawkins et al. | |
| 6,058,379 A | 5/2000 | Odom et al. | |
| 6,098,051 A | 8/2000 | Lupien et al. | |
| 6,141,653 A | 10/2000 | Conklin et al. | |
| 6,173,270 B1 | 1/2001 | Cristofich et al. | |
| 6,236,972 B1 | 5/2001 | Shkedy | |
| 6,247,000 B1 | 6/2001 | Hawkins et al. | |
| 6,278,982 B1 | 8/2001 | Korhammer et al. | |
| 6,285,989 B1 | 9/2001 | Shoham | |
| 6,321,212 B1 | 11/2001 | Lange | |
| 6,393,409 B2 | 5/2002 | Young et al. | |
| 6,405,180 B2 | 6/2002 | Tilfors et al. | |
| 6,408,282 B1 | 6/2002 | Buist | |
| 6,418,419 B1 | 7/2002 | Nieboer et al. | |
| 6,421,653 B1 | 7/2002 | May | |
| 6,505,175 B1 | 1/2003 | Silverman et al. | |
| 6,532,460 B1 | 3/2003 | Amanat et al. | |
| 6,536,935 B2 | 3/2003 | Parunak et al. | |
| H2064 H | 5/2003 | Buchalter | |
| 6,601,044 B1 | 7/2003 | Wallman | |
| 6,606,744 B1 | 8/2003 | Mikurak | |
| 6,615,188 B1 | 9/2003 | Breen et al. | |
| 6,618,707 B1 | 9/2003 | Gary | |
| 6,625,583 B1 | 9/2003 | Silverman et al. | |
| 6,629,082 B1 | 9/2003 | Hambrecht et al. | |
| 6,731,729 B2 | 5/2004 | Eng et al. | |
| 6,766,307 B1 | 7/2004 | Israel et al. | |
| 6,772,132 B1 | 8/2004 | Kemp, II et al. | |
| 6,807,533 B1 | 10/2004 | Land et al. | |
| 6,829,589 B1 | 12/2004 | Saliba | |
| 6,847,934 B1 | 1/2005 | Lin et al. | |
| 6,871,191 B1 | 3/2005 | Kinney, Jr. et al. | |
| 6,909,941 B2 | 6/2005 | Scott et al. | |
| 6,938,011 B1 | 8/2005 | Kemp, II et al. | |
| 6,963,856 B2 | 11/2005 | Lutnick et al. | |
| 6,983,011 B1 | 1/2006 | Hara et al. | |
| 6,983,260 B2 | 1/2006 | Hummelgren | |
| 7,035,820 B2 | 4/2006 | Goodwin et al. | |
| 7,058,602 B1 | 6/2006 | La Mura et al. | |
| 7,110,969 B1 | 9/2006 | Bennett et al. | |
| 7,110,975 B2 | 9/2006 | Marks de Chabris et al. | |
| 7,113,924 B2 | 9/2006 | Fishbain | |
| 7,127,424 B2 | 10/2006 | Kemp, II et al. | |
| 7,152,037 B2 | 12/2006 | Smith | |
| 7,155,409 B1 | 12/2006 | Stroh | |
| 7,162,447 B1 | 1/2007 | Cushing | |
| 7,181,419 B1 | 2/2007 | Mesaros | |
| 7,197,483 B2 | 3/2007 | Brady et al. | |
| 7,209,896 B1 | 4/2007 | Serkin et al. | |
| 7,213,000 B2 | 5/2007 | Gutierrez et al. | |
| 7,242,669 B2 | 7/2007 | Bundy et al. | |
| 7,246,092 B1 | 7/2007 | Peterson et al. | |
| 7,249,114 B2 | 7/2007 | Burchetta et al. | |
| 7,277,868 B2 | 10/2007 | Terashima | |
| 7,310,620 B2 | 12/2007 | Moore et al. | |
| 7,330,834 B1 | 2/2008 | LaPierre | |
| 7,383,220 B1 | 6/2008 | Keith | |
| 7,386,497 B1 | 6/2008 | Gooch | |
| 7,392,214 B1 | 6/2008 | Fraser et al. | |
| 7,401,044 B1 | 7/2008 | Fraser et al. | |
| 7,536,338 B2 | 5/2009 | Guler et al. | |
| 7,835,987 B2 | 11/2010 | Daley et al. | |
| 7,840,477 B2 | 11/2010 | Claus et al. | |
| 7,979,339 B2 | 7/2011 | Claus et al. | |
| 8,626,637 B1 * | 1/2014 | Gooch et al. | 705/37 |
| 8,666,858 B2 | 3/2014 | Kemp et al. | |
| 2001/0037284 A1 | 11/2001 | Finkelstein et al. | |
| 2001/0042040 A1 | 11/2001 | Keith | |
| 2001/0049651 A1 | 12/2001 | Selleck | |
| 2001/0051909 A1 | 12/2001 | Keith | |
| 2001/0056396 A1 | 12/2001 | Goino | |
| 2002/0010672 A1 | 1/2002 | Waelbroeck et al. | |
| 2002/0016758 A1 | 2/2002 | Grigsby | |
| 2002/0023037 A1 | 2/2002 | White, Jr. | |
| 2002/0038277 A1 | 3/2002 | Yuan | |
| 2002/0046127 A1 | 4/2002 | Reading et al. | |
| 2002/0052822 A1 | 5/2002 | Terashima | |
| 2002/0052827 A1 | 5/2002 | Waelbroeck et al. | |
| 2002/0055901 A1 | 5/2002 | Gianakouros et al. | |
| 2002/0073016 A1 | 6/2002 | Furbrush et al. | |
| 2002/0087451 A1 | 7/2002 | Rieger et al. | |
| 2002/0091606 A1 | 7/2002 | Shapiro | |
| 2002/0091617 A1 * | 7/2002 | Keith | 705/37 |
| 2002/0099640 A1 | 7/2002 | Lange | |
| 2002/0108141 A1 | 8/2002 | Kang et al. | |
| 2002/0111907 A1 | 8/2002 | Ling | |
| 2002/0116318 A1 * | 8/2002 | Thomas et al. | 705/37 |
| 2002/0120546 A1 | 8/2002 | Zajac | |
| 2002/0143701 A1 | 10/2002 | Maguire et al. | |
| 2002/0147604 A1 | 10/2002 | Slate et al. | |
| 2002/0152163 A1 | 10/2002 | Bezos | |
| 2002/0156719 A1 | 10/2002 | Finebaum et al. | |
| 2002/0169703 A1 | 11/2002 | Lutnick et al. | |
| 2002/0178104 A1 | 11/2002 | Hausman | |
| 2002/0188548 A1 | 12/2002 | Bunda | |
| 2002/0198816 A1 | 12/2002 | Gilbert et al. | |
| 2003/0004858 A1 | 1/2003 | Schmitz et al. | |
| 2003/0009411 A1 | 1/2003 | Ram et al. | |
| 2003/0009412 A1 | 1/2003 | Furbush et al. | |
| 2003/0009413 A1 | 1/2003 | Furbrush et al. | |
| 2003/0014351 A1 | 1/2003 | Neff et al. | |
| 2003/0061149 A1 | 3/2003 | Ajitsaria et al. | |
| 2003/0093343 A1 | 5/2003 | Huttenlocher et al. | |
| 2003/0093362 A1 | 5/2003 | Tupper et al. | |
| 2003/0097325 A1 | 5/2003 | Friesen et al. | |
| 2003/0101128 A1 | 5/2003 | Abernethy | |
| 2003/0101130 A1 | 5/2003 | Cliff | |
| 2003/0135453 A1 | 7/2003 | Caulfield et al. | |
| 2003/0149636 A1 | 8/2003 | Lutnick et al. | |
| 2003/0149661 A1 | 8/2003 | Mithcell et al. | |
| 2003/0158960 A1 | 8/2003 | Engberg et al. | |
| 2003/0167224 A1 | 9/2003 | Periwal | |
| 2003/0172024 A1 | 9/2003 | Kokis et al. | |
| 2003/0177082 A1 | 9/2003 | Buckwalter | |
| 2003/0177085 A1 | 9/2003 | Buckwalter et al. | |
| 2003/0177086 A1 | 9/2003 | Gomber et al. | |
| 2003/0191710 A1 | 10/2003 | Green et al. | |
| 2003/0216932 A1 | 11/2003 | Foley | |
| 2003/0220867 A1 | 11/2003 | Goodwin et al. | |
| 2003/0225646 A1 | 12/2003 | Failla et al. | |
| 2003/0225674 A1 | 12/2003 | Hughes et al. | |
| 2003/0229557 A1 | 12/2003 | Richmann et al. | |
| 2003/0229569 A1 | 12/2003 | Nalbandian et al. | |

(56) References Cited

U.S. PATENT DOCUMENTS

| | | |
|---|---|---|
| 2003/0233278 A1 | 12/2003 | Marshall |
| 2003/0236679 A1 | 12/2003 | Galves et al. |
| 2003/0236729 A1 | 12/2003 | Epstein et al. |
| 2004/0019551 A1 | 1/2004 | Martyn et al. |
| 2004/0024684 A1 | 2/2004 | Montepeque |
| 2004/0034591 A1 | 2/2004 | Waelbroeck et al. |
| 2004/0059596 A1 | 3/2004 | Vaidyanathan et al. |
| 2004/0059666 A1 | 3/2004 | Walebroeck et al. |
| 2004/0064351 A1 | 4/2004 | Mikurak |
| 2004/0093296 A1 | 5/2004 | Phelan et al. |
| 2004/0103054 A1 | 5/2004 | Singer |
| 2004/0133526 A1 | 7/2004 | Shmueli et al. |
| 2004/0143538 A1 | 7/2004 | Korhammer et al. |
| 2004/0177024 A1 | 9/2004 | Bok et al. |
| 2004/0210505 A1 | 10/2004 | Pourhamid |
| 2004/0210511 A1 | 10/2004 | Waelbroeck et al. |
| 2004/0210512 A1 | 10/2004 | Fraser et al. |
| 2004/0210514 A1 | 10/2004 | Kemp et al. |
| 2004/0215538 A1 | 10/2004 | Smith et al. |
| 2004/0236636 A1 | 11/2004 | Lutnick et al. |
| 2004/0236662 A1 | 11/2004 | Korhammer et al. |
| 2004/0236668 A1 | 11/2004 | Toffey |
| 2004/0236669 A1 | 11/2004 | Horst et al. |
| 2005/0015323 A1 | 1/2005 | Myr |
| 2005/0017710 A1 | 1/2005 | Steinich et al. |
| 2005/0027635 A1 | 2/2005 | Monroe et al. |
| 2005/0044031 A1 | 2/2005 | Lebedev |
| 2005/0055304 A1 | 3/2005 | Lutnick et al. |
| 2005/0055305 A1 | 3/2005 | Lutnick et al. |
| 2005/0075898 A1 | 4/2005 | Wasserman et al. |
| 2005/0108143 A1 | 5/2005 | Beadle et al. |
| 2005/0119966 A1 | 6/2005 | Sandholm et al. |
| 2005/0125326 A1 | 6/2005 | Nangalia et al. |
| 2005/0125340 A1 | 6/2005 | Lin et al. |
| 2005/0154630 A1 | 7/2005 | Lin et al. |
| 2005/0160032 A1 | 7/2005 | Lutnick et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0289042 A1* | 12/2005 | Friesen .................. 705/37 |
| 2005/0289043 A1 | 12/2005 | Maudlin |
| 2006/0010080 A1 | 1/2006 | Weild |
| 2006/0015436 A1 | 1/2006 | Burns et al. |
| 2006/0015441 A1 | 1/2006 | Burkhardt et al. |
| 2006/0026090 A1 | 2/2006 | Balabon |
| 2006/0031177 A1 | 2/2006 | Rule |
| 2006/0059079 A1 | 3/2006 | Howorka |
| 2006/0080222 A1 | 4/2006 | Lutnick et al. |
| 2006/0085319 A1 | 4/2006 | Nangalia et al. |
| 2006/0089837 A1 | 4/2006 | Adar et al. |
| 2006/0095363 A1 | 5/2006 | May |
| 2006/0136318 A1 | 6/2006 | Rafieyan et al. |
| 2006/0149662 A1 | 7/2006 | Nordlicht et al. |
| 2006/0149668 A1 | 7/2006 | Zafrir |
| 2006/0173693 A1 | 8/2006 | Arazi et al. |
| 2006/0190386 A1 | 8/2006 | Levy |
| 2006/0218071 A1 | 9/2006 | Sweeting |
| 2003/0253882 | 11/2006 | Adcock et al. |
| 2006/0253379 A1 | 11/2006 | Adcock et al. |
| 2006/0253381 A1 | 11/2006 | Adock et al. |
| 2006/0253382 A1 | 11/2006 | Adcock et al. |
| 2006/0259404 A1 | 11/2006 | Brumfield et al. |
| 2006/0259427 A1 | 11/2006 | Randell et al. |
| 2006/0277137 A1 | 12/2006 | Claus et al. |
| 2007/0005481 A1 | 1/2007 | Kedia et al. |
| 2007/0005484 A1 | 1/2007 | Waelbroeck et al. |
| 2007/0100734 A1 | 5/2007 | Berger et al. |
| 2007/0118464 A1 | 5/2007 | Avery |
| 2007/0130048 A1 | 6/2007 | Claus et al. |
| 2007/0130050 A1 | 6/2007 | Claus et al. |
| 2007/0156574 A1 | 7/2007 | Marynowski et al. |
| 2007/0156754 A1 | 7/2007 | Marynowski et al. |
| 2007/0174179 A1 | 7/2007 | Avery |
| 2007/0219898 A1 | 9/2007 | Burkhardt et al. |
| 2007/0288349 A1 | 12/2007 | Chang |
| 2008/0010186 A1 | 1/2008 | Weimer et al. |
| 2008/0015974 A1 | 1/2008 | Balabon |
| 2008/0097893 A1 | 4/2008 | Walsky et al. |
| 2008/0319891 A1 | 12/2008 | Scheinberg et al. |
| 2011/0071937 A1 | 3/2011 | Claus et al. |
| 2011/0238556 A1 | 9/2011 | Harmaty |
| 2011/0270736 A1 | 11/2011 | Claus et al. |

FOREIGN PATENT DOCUMENTS

| | | |
|---|---|---|
| GB | 2389687 | 12/2003 |
| GB | 2411492 | 8/2005 |
| JP | 10-320458 | 4/1998 |
| JP | H10-207956 | 8/1998 |
| JP | 2003-524241 | 8/2001 |
| JP | 2002-007707 | 1/2002 |
| JP | 2002-007782 | 1/2002 |
| JP | 2002-063402 | 2/2002 |
| JP | 2002-109268 | 4/2002 |
| JP | 2002-133113 | 5/2002 |
| JP | 2002-183446 | 6/2002 |
| JP | 2002-189882 | 7/2002 |
| JP | 2002-197283 | 7/2002 |
| JP | 2002-203112 | 7/2002 |
| JP | 2002-207880 | 7/2002 |
| JP | 2002-230304 | 8/2002 |
| JP | 2002-259761 | 9/2002 |
| JP | 2002-269349 | 9/2002 |
| JP | 2002-542543 | 12/2002 |
| JP | 2003-058733 | 2/2003 |
| JP | 2003-058741 | 2/2003 |
| JP | 2003-108773 | 4/2003 |
| JP | 2003-122946 | 4/2003 |
| JP | 2003-515824 | 5/2003 |
| JP | 2003-522992 | 7/2003 |
| JP | 2003-525480 | 8/2003 |
| JP | 2003-331188 | 11/2003 |
| JP | 3493193 | 11/2003 |
| JP | 2003345987 | 12/2003 |
| JP | 2004-110784 | 4/2004 |
| JP | 2005-202977 | 7/2005 |
| JP | 2006-011731 | 1/2006 |
| JP | 2004-524592 | 8/2012 |
| WO | WO 1998/37655 | 8/1998 |
| WO | WO 00/11587 | 3/2000 |
| WO | WO 00/26834 | 5/2000 |
| WO | WO 2000/063814 | 10/2000 |
| WO | WO/2000/067172 | 11/2000 |
| WO | WO/2000/077670 | 12/2000 |
| WO | WO 01/09757 | 2/2001 |
| WO | WO 01/25996 | 4/2001 |
| WO | WO 01/48655 A1 | 7/2001 |
| WO | WO 01/52150 | 7/2001 |
| WO | WO 01/54037 | 7/2001 |
| WO | WO/2001/055923 | 8/2001 |
| WO | WO 2001/057612 | 8/2001 |
| WO | WO 01/75752 | 10/2001 |
| WO | WO 01/77946 | 10/2001 |
| WO | WO2001/077957 | 11/2001 |
| WO | WO 2001/093169 A1 | 12/2001 |
| WO | WO 02/071297 A1 | 9/2002 |
| WO | WO 02/086657 A2 | 10/2002 |
| WO | WO 2003/001325 | 1/2003 |
| WO | WO03/012588 | 2/2003 |
| WO | WO 2004/008296 | 1/2004 |
| WO | WO 2004/008309 | 1/2004 |
| WO | WO 2004/68272 | 8/2004 |
| WO | WO2004/088460 | 10/2004 |
| WO | WO 2005/083603 | 9/2005 |

OTHER PUBLICATIONS

International Search Report and Written Opinion for International Application No. PCT/US07/89226, dated Jun. 25, 2008 (9 pages).
U.S. Appl. No. 11/967,392, filed Dec. 31, 2007, Weiss, et al.
U.S. Appl. No. 11/967,728, filed Dec. 31, 2017, Weiss, et al.

(56) References Cited

OTHER PUBLICATIONS

International Search report for International Application No. PCT/US 08/571031; dated Jun. 24 2008; 2 pages.
Zwick, Steve, "Error highlights electronic risks", Futures, vol. 31, No. 1, 2 pages.
U.S. Appl. No. 11/967,696, filed Dec. 2007, Weiss, et al.
Zwick, Steve, "New era for out-trades", Trade Trends, Futures, pp. 68-71.
USPTO Office Action for U.S. Appl. No. 11/967,392 dated Apr. 27, 2009, 14 pages.
USPTO Office Action for U.S. Appl. No. 11/967,728 dated Jun. 2, 2009, 14 pages.
USPTO Office Action (Restriction Requirement) for U.S. Appl. No. 11/687,009 dated Oct. 30, 2008, 5 pages.
USPTO Office Action for U.S. Appl. No. 11/687,009 dated Feb. 25, 2009, 5 pages.
USPTO Office Action (Advisory Action) for U.S. Appl. No. 11/687,009 dated Jun. 26, 2009, 3 pages.
Notification of Transmittal of International Search Report and Written Opinion for PCT Application No. PCT/US06/30636; dated Apr. 30, 2007; 8 pages.
USPTO Office Action for U.S. Appl. No. 11/499,496, dated May 1, 2008 (12 pages).
USPTO Office Action for U.S. Appl. No. 10/767,546, dated Oct. 29, 2008 (35 pages).
USPTO Office Action for U.S. Appl. No. 10/767,588, Oct. 23, 2008 (8 pages).
Patent Pending U.S. Appl. No. 10/767,546 entitled System and Methods for Routing a Trading Order.
Patent Pending U.S. Appl. No. 10/767,588 entitled System and Methods for Routing a Trading Order According to Price.
Patent Pending U.S. Appl. No. 10/767,699 entitled System and Methods for Controlling the Disclosure of a Trading Order.
Patent Pending U.S. Appl. No. 10/766,965 entitled System and Methods for Avoiding Transaction Costs Associated with Trading Order.
Patent Pending U.S. Appl. No. 10/767,649 entitled System and Methods for Routing a Trading Order.
USPTO Office Action for U.S. Appl. No. 10/767,699, dated Oct. 26, 2007 (22 pages).
USPTO Office Action for U.S. Appl. No. 10/767,649, dated Mar. 3, 2008 (24 pages).
USPTO Office Action for U.S. Appl. No. 10/767,546, dated Feb. 4, 2008, (48 pages).
USPTO Office Action for U.S. Appl. No. 10/766,965, dated Feb. 7, 2008 (49 pages).
USPTO Office Action for U.S. Appl. No. 10/767,588, dated Jan. 11, 2008 (19 pages).
European Patent Office Examination Report for Application No. 05712564.3-1238; dated Nov. 14, 2007 (5 pages).
European Patent Office Examination Report for Application No. 05712566.8-1238; dated Nov. 14, 2007 (5 pages).
Notification of Transmittal of International Search Report and Written Opinion for PCT Application No. PCT/US06/30638; dated Apr. 20, 2007 (8 pages).
Vergote, et. al. How to match Trades and Quotes for NYSE Stocks, Mar. 2005 (21 pages).
Notification of Transmittal of International Search Report and Written Opinion for PCT Application No. PCT/US05/03166; dated Nov. 4, 2005 (7 pages).
Notification of Transmittal of International Search Report and Written Opinion for PCT Application No. PCT/US05/03159; dated Feb. 24, 2006, (11 pages).
Notification of Transmittal of International Search Report and Written Opinion for PCT Application No. PCT/US05/03164; dated Dec. 13, 2006 (6 pages).
Notification of Transmittal of International Search Report and Written Opinion for PCT Application No. PCT/US05/03163; dated Jan. 4, 2007 (9 pages).
Notification of Transmittal of International Search Report and Written Opinion for PCT Application No. PCT/US05/03168; dated Jan. 29, 2007 (6 pages).
Supplementary European Search Report for International Application No. PCT/US05/03166; dated Jan. 8, 2007 (3 pages).
Parlour, Christine, Price Dynamics in Limit Order Markets, Queens University, Kingston Ontario Canada, Nov. 1, 1995 (111 pages).
Weber, Bruce; Screen-Based Trading in Futures Markets: Recent Developments and Research Propositions, Abstract, ISBN 076950013, Jun. 21, 2005 (1 page).
Balance of Trade, Banking Technology, vol. 20, No. 9 ISSN 0266-0865, Nov. 1, 2004; pp. 42-44.
USPTO Office Action for U.S. Appl. No. 10/767,699, dated Jul. 22, 2008 (13 pages).
Supplementary European Search Report for Application No. 05712562.7; dated Jul. 28, 2008 (2 pages).
Supplementary European Search Report for Application No. 05712563.5; dated Jul. 28, 2008 (2 pages).
USPTO Office Action for U.S. Appl. No. 11/499,496, dated Apr. 27, 2009 (3 pages).
USPTO Office Action for U.S. Appl. No. 11/499,496, dated Jan. 26, 2009 (16 pages).
USPTO Office Action for U.S. Appl. No. 11/499,833, dated May 19, 2008 (12 pages).
USPTO Office Action for U.S. Appl. No. 11/499,833, dated Nov. 14, 2008 (14 pages).
USPTO Office Action for U.S. Appl. No. 11/499,833, dated Aug. 18, 2009 (15 pages).
USPTO Office Action for U.S. Appl. No. 10/766,965, dated Nov. 21, 2008 (20 pages).
Australian Examiner's Report for AU Application No. 2006278384 dated, Aug. 5, 2009 (3 pages).
USPTO Office Action for U.S. Appl. No. 10/767,546, dated Oct. 7, 2009 (19 pages).
USPTO Office Action for U.S. Appl. No. 10/767,588, dated Oct. 27, 2009 (6 pages).
USPTO Office Action for U.S. Appl. No. 10/767,699, dated Oct. 20, 2008 (3 pages).
USPTO Examiner Interview Summary for U.S. Appl. No. 10/766,965, dated Sep. 22, 2009 (2 pages).
USPTO Office Action for U.S. Appl. No. 10/766,965, dated Oct. 28, 2009 (2 pages).
USPTO Examiner Interview Summary for U.S. Appl. No. 10/767,649, dated Jun. 23, 2009 (2 pages).
USPTO Examiner Interview Summary for U.S. Appl. No. 11/499,833, dated Sep. 3, 2009 (2 pages).
USPTO Examiner Interview Summary for U.S. Appl. No. 11/499,496, dated Jul. 27, 2009 (4 pages).
Australian Examiner's Report for Application No. 2005208980, dated Nov. 17, 2009 (2 pages).
Australian Examiner's Report for Application No. 2005208978, dated Nov. 26, 2009 (1 page).
Australian Examiner's Report for Application No. 2005208981, dated Dec. 14, 2009 (3 pages).
USPTO Office Action for U.S. Appl. No. 10/767,649, dated Aug. 27, 2009 (20 pages).
U.S. Appl. No. 60/706,109, filed Aug. 5, 2005, Noviello.
USPTO Examiner Interview Summary for U.S. Appl. No. 10/767,699, dated Dec. 23, 2009 (3 pages).
USPTO Examiner's Answer to Appeal Brief for U.S. Appl. No. 10/767,699, dated Dec. 24, 2009 (16 pages).
USPTO Examiner's Answer to Appeal Brief for U.S. Appl. No. 10/766,965, dated Jan. 20, 2010 (19 pages).
USPTO Notice of Allowance and Fees Due and Examiner Interview Summary for U.S. Appl. No. 11/499,496, dated Feb. 17, 2010 (89 pages).
George Simon & Kathryn Trikla, "The Regulation of Specialists and Implications for the Future," Business Lawyer, Nov. 2005, pp. 217-387.
U.S. Appl. No. 12/945,046, filed Nov. 12, 2010, Daley et al.
The 'Hybrid Approach': A review of NYSE's Market Structure Proposal, Mondaq Business Briefing, NA, Dec. 9, 2004.

(56) References Cited

OTHER PUBLICATIONS

Australian Examiner's Report for Application No. 2006278382, dated Jul. 9, 2009 (3 pages).
USPTO Notice of Allowance and Fees Due for U.S. Appl. No. 11/499,833, dated Mar. 12, 2010 (9 pages).
New AZX Session, Trader's v10 n130, Oct. 1997, p. 4 (p. 20 of EIC search).
The New Trading Landscape for Institutional Investors, Institutional Trades Can Be Costly If Investors Aren't Careful, Norman Harris, Institutional Investor 36, 5, S1 (7) May 2002 (p. 21 of EIC search).
Scientific and Technical Information Center's Search Report EIC 3600, dated Jul. 9, 2009 (88 pages).
International Preliminary Report on Patentability for PCT Application No. PCT/US05/03164, dated Jan. 9, 2007 (4 pages).
Japanese Office Action with English translation for Application No. 2006-551589, dated Apr. 20, 2010 (6 pages).
International Preliminary Report on Patentability for PCT Application No. PCT/US05/03166, dated Jul. 31, 2006 (4 pages).
Japanese Office Action with English translation for Application No. 2006-551590, dated Apr. 20, 2010 (6 pages).
International Preliminary Report on Patentability for PCT Application No. PCT/US05/03163, dated Jan. 23, 2007 (5 pages).
Japanese Office Action with English translation for Application No. 2006-551588, dated Apr. 27, 2010 (8 pages).
International Preliminary Report on Patentability for PCT Application No. PCT/US05/03168, dated Feb. 13, 2007 (4 pages).
Japanese Office Action with English translation for Application No. 2006-551591, dated Apr. 20, 2010 (6 pages).
International Preliminary Report on Patentability for PCT Application No. PCT/US05/03159, dated Jul. 31, 2006 (6 pages).
Supplementary European Search Report for Application No. EP 05712558, dated Dec. 5, 2008 (2 pages).
Japanese Office Action with English translation for Application No. 2006-551587, dated Apr. 20, 2010 (6 pages).
International Preliminary Report on Patentability for PCT Application No. PCT/US06/30638, dated Feb. 5, 2008 (5 pages).
International Preliminary Report on Patentability for PCT Application No. PCT/US06/30636, dated Feb. 5, 2008 (5 pages).
Donald L. Luskin, Index Options & Futures: The Complete Guide, Toyo Keizai, Inc., Aug. 9, 1990, p. 32-35 [translation of an English book, originally published by John Wiley & Sons, Inc., 1987].
EPO: "Mitteilung des Europaischen Patentamts vom 1. Oct. 2007 Ober Geschaftsmethoden=Notice from the European Patent Office dated Oct. 1, 2007 concerning business methods=Communique de l'Office europeen des brevets,en date du 1er octobre 2007, concernant les methodes dans le domaine des activites"Journal Officiel De L'Office Europeen Des Brevets.Official Journal of the European Patent Office.Amtsblattt Des Europaeischen Patentamts, Oeb, Munchen, DE, vol. 30, No. 11, Nov. 1, 2007 (Nov. 1, 2007) , pp. 592-593, XP0079055251 SSN: 0170-9291 (2 pages).
USPTO Supplemental Notice of Allowance and Fees Due for U.S. Appl. No. 11/499,496, dated May 26, 2010 (4 pages).
USPTO Dismissal of Appeal for U.S. Appl. No. 10/766,965, dated Jun. 7, 2010 (3 pages).
European Patent Office Communication and Official Action for Application No. 05712562.7, dated May 18, 2010 (6 pages).
European Patent Office Communication and Official Action for Application No. 05712563.5, dated May 18, 2010 (6 pages).
European Patent Office Communication and Official Action for Application No. 05712558.5, dated May 18, 2010 (6 pages).
USPTO Notice of Allowance and Fees Due for U.S. Appl. No. 10/767,588, dated Jun. 25, 2010 (7 pages).
Australian Examiner's Report for Application No. 2005208979, dated Nov. 13, 2009 (2 pages).
European Patent Office Communication and Extended European Search Report for Application No. 06789488.1, dated Jul. 6, 2010 (10 pages).
European Patent Office Communication and Extended European Search Report for Application No. 06789490.7, dated Jul. 7, 2010 (8 pages).

Australian Examiner's Report for Application No. 2005208977, dated Nov. 20, 2009 (8 pages).
USPTO Office Action for U.S. Appl. No. 10/767,546, dated Aug. 6, 2010 (39 pages).
USPTO Notice of Allowance and Fees Due for U.S. Appl. No. 10/767,588, dated Jul. 22, 2010 (7 pages).
USPTO Supplemental Notice of Allowance and Fees Due for U.S. Appl. No. 11/499,496, dated Jul. 23, 2010 (9 pages).
USPTO Supplemental Notice of Allowance and Fees Due for U.S. Appl. No. 11/499,496, dated Aug. 10, 2010 (4 pages).
Japanese Office Action with English translation for Application No. 2006-551591, dated Aug. 24, 2010 (4 pages).
Japanese Office Action with English translation for Application No. 2006-551590, dated Aug. 24, 2010 (6 pages).
Daisuke Ochiai, "Electronic Finance and Security Trading, 'London Stock Exchange Transfers to New Trading System'", Capital Market Quarterly, Autumn 1997, vol. 1, No. 2, Nomura Research Institute, Nov. 1, 1997, pp. 102-108.
Japanese Office Action with English translation for Application No. 2006-551588, dated Aug. 31, 2010 (8 pages).
Japanese Office Action with English translation for Application No. 2006-551589, dated Aug. 31, 2010 (7 pages).
USPTO Notice of Allowance and Fees Due for U.S. Appl. No. 10/767,588, Sep. 7, 2010 (3 pages).
USPTO Notice of Allowance and Fees Due for U.S. Appl. No. 11/499,833, dated Sep. 15, 2010 (10 pages).
USPTO Notice of Allowance and Fees Due for U.S. Appl. No. 10/767,588, dated Sep. 21, 2010 (7 pages).
Australian Notice of Acceptance for Application No. 2005208980, dated Sep. 23, 2010 (3 pages).
Japanese Office Action with English translation for Application No. 2008-525266, dated Sep. 21, 2010 (7 pages).
Australian Notice of Acceptance for Application No. 2005208978, dated Nov. 30, 2010 (3 pages).
Australian Examiner's Report for Application No. 2005208977, dated Dec. 2, 2010 (1 page).
Japanese Office Action with English translation for Application No. 2008-525268, dated Nov. 24, 2010 (7 pages).
Australian Notice of Acceptance for Application No. 2005208981, dated Dec. 14, 2010 (3 pages).
Australian Notice of Acceptance for Application No. 2005208979, dated Dec. 20, 2010 (3 pages).
Japanese Office Action with English translation for Application No. 2006-551587, dated Nov. 24, 2010 (6 pages).
Japanese Office Action with English translation for Application No. 2006-551589, dated Dec. 7, 2010 (6 pages).
USPTO Office Action for U.S. Appl. No. 10/767,699, dated Dec. 22, 2010 (13 pages).
Japanese Office Action with English translation for Application No. 2006-551590, dated Jan. 11, 2011 (4 pages).
Japanese Office Action with English translation for Application No. 2006-551591, dated Jan. 11, 2011 (4 pages).
Australian Notice of Acceptance for Application No. 2006278382, dated Apr. 11, 2011 (3 pages).
USPTO Office Action for U.S. Appl. No. 10/767,546, dated May 20, 2011 (47 pages).
Japanese Office Action with English translation for Application No. 2006-551588, dated Apr. 26, 2011 (6 pages).
Japanese Office Action with English translation for Application No. 2008-525268, dated Jun. 21, 2011 (4 pages).
Japanese Office Action with English translation for Application No. 2008-525266, dated Jun. 28, 2011 (7 pages).
Japanese Office Action with English translation for Application No. 2006-551587, dated Jul. 12, 2011 (6 pages).
Lee, et. al., "R-Trader: An Automatic Stock Trading System Based on Reinforcement Learning," The British Library, pp. 785-794, (Abstract translated).
Tan, "Using genetic algorithm to optimize an oscillator-based market timing system," The British Library, pp. B115-B122.
Australian Notice of Acceptance for Application No. 2005208977, dated Aug. 24, 2011 (3 pages).
USPTO Office Action for Application No. 10/767,699, dated Sep. 15, 2011 (13 pages).

(56) References Cited

OTHER PUBLICATIONS

Ye, et. al., Application of Genetic Algorithm to Optimal Portfolio with Risk Control,: The British Library, pp. 351-354.
Steiner, et. al., "Portfolio optimization with a neural network implementation of the coherent market hypothesis," The British Library, Elsevier Science B.V., pp. 27-40; rev. Nov. 11, 1995.
Lin, et. al., "The Applications of Genetic Algorithms in Stock Market Data Mining Optimisation," Faculty of Information Technology, University of Technology, 9 pages; 2000.
Fukutome, et. al., "Bidding market based on single price model with network constraints," IEEE, pp. 1245-1250 plus 4 pages; 2004.
Wachi, et. al., "Application for Single price auction model (SPA) in AC Network," pp. 81-89; 2005.
Wallman; Technology Takes to Securities TradingIIEE, Spectrum; pp. 60-65; Feb. 1997.
Schmerken; Cybercorp to Introduce Trading via CBOE; Wall Street & technology; coversheet plus p. 50; Jan. 2000.
Zeroual; An Open Distributed Request Propagation Approach for Trading Services; Proceedings of the Second International Conference on Machine Learning and Cybernetics, Xi'an; pp. 3253-3258; Nov. 2003.
International Search Report and the Written Opinion for International Application No. PCT/US06/22441; 5 pages; dated May 1, 2007.
International Search Report and the Written Opinion for International Application No. PCT/US07/07602; 5 pages; dated Sep. 24, 2007.
USPTO Office Action for U.S. Appl. No. 11/398,241; 11 pages; dated Dec. 15, 2008.
USPTO Office Action for U.S. Appl. No. 11/146,646; 12 pages; dated Jan. 26, 2009.
USPTO Office Action for U.S. Appl. No. 11/398,241; 14 pages; dated Oct. 14, 2009.
USPTO Office Action for U.S. Appl. No. 11/146,646; 13 pages; dated Jan. 19, 2010.
USPTO Notice of Allowance for U.S. Appl. No. 11/146,646; 7 pages; dated Sep. 16, 2010.
Hasbrouck et al.: Limit orders and volatility in a Hybrid Market: The Island ECN Department of Finance, Stern School, NYU, Sep. 26, 2001, pp. 1-54.
Market Access Subcommittee: Best Practices for Organized Electronic Markets, Commodity Futures Trading Commission, Nov. 27, 2001, pp. 1-22.
Bongiovanni, et al.: Let's Play Hide-and-Seek: The Location and Size of Undisclosed Limit Order Volume, The Journal of Trading, Summer 2006, pp. 34-46.
USPTO Pre-Brief Appeal Conference Decision for U.S. Appl. No. 11/398,241; 2 pages; dated May 17, 2010.
European Communication and Supplementary Search Report for Application No. 06772668.7 dated Aug. 20, 2009; 5 pages; (this app has been Abandoned).
AU Examination Report for Application No. 2007201453 dated Jul. 30, 2010; 1 page.
AU Examination Report for Application No. 2006254819 dated Oct. 28, 2010; 2 pages.
USPTO Office Action for U.S. Appl. No. 12/953,407, dated Mar. 14, 2011 (15 pages).
European Communication and Search Report for Application No. 07754165.4 dated May 26, 2011; 9 pages.
Japanese Office Action with English translation for Application No. 2007-097157; dated Jun. 20, 2011 (4 pages).
USPTO Notice of Allowance for U.S. Appl. No. 12/953,407; 8 pages; dated Oct. 7, 2011.
NASDAQ: SuperMontage Release 1.0—Functional Description, Version 2.0, 2001, pp. 1-15.
Hendershott, T.: Electronic Trading in Financial Market, Jul./Aug. 2003, IT PRO, IEEE Computer Society, pp. 1-5.
USPTO Notice of Allowance and Fees Due for U.S. Appl. No. 12/953,407, dated Oct. 7, 2011 (8 pages).
USPTO Notice of Allowance and Fees Due for U.S. Appl. No. 12/953,407, dated Oct. 19, 2011 (7 pages).
USPTO Office Action for U.S. Appl. No. 13/180,010, dated Oct. 27, 2011 (15 pages).
Japanese Office Action with English translation for Application No. 2008-515959, dated Sep. 6, 2011 (6 pages).
Australian Examiner's Report for AU Application No. 2006278384 dated, May 3, 2011 (2 pages).
Japanese Notice of Allowance for Application No. 2008-525268, dated Nov. 22, 2011 (3 pages).
International Preliminary Report for International Application No. PCT/US2006/022441, dated Dec. 11, 2007 (5 pages).
International Preliminary Report for International Application No. PCT/US2007/007602, dated Oct. 8, 2008 (5 pages).
U.S. PTO Office Action for U.S. Appl. No. 11/687,009; dated Feb. 25, 2009; 14 pages.
Notification of Transmittal of International Search Report and Written Opinion for PCT Application No. PCT/US08/57031; dated Jun. 24, 2008; 9 pages.
Australian Examination Report for Application No. 2008201199; dated Feb. 8, 2012; 2 pages.
Notice of Panel Decision for U.S. Appl. No. 11/687,009; dated Mar. 15, 2010; 2 pages.
U.S. PTO Office Action for U.S. Appl. No. 11/687,009; dated Sep. 18, 2009; 10 pages.
U.S. PTO Office Action for U.S. Appl. No. 13/041,353; dated Jun. 27, 2012; 8 pages.
CA Examiners Report for Application No. 2,554,468; dated Jul. 10, 2012; 6 pages.
JP Office Action for Application No. 2006-551587; dated Oct. 2, 2012; 8 pages (w/English translation).
USPTO Examiners Answer to Appeal Brief for U.S. Appl. No. 11/687,009; dated Nov. 22, 2010 (16 pages).
JP Office Action for Application No. 2008-0679644; dated Jan. 8, 2013; 6 pages (w/ English translation).
Business Manual at Life Insurance Sales Office, New Contract volume, First edition, Daitokyo Life, Jan. 31, 2001, pp. 9-24 to 9-27.
Soichi Kadokawa, Basics and practice of commodity funds, Super Guide of Commodity Futures Trading, Diamond, Inc., Apr. 3, 2001, 2001 edition, pp. 110-114.
JP Office Action for Application No. 2011-096192; dated Feb. 19, 2013; 6 pages (w/ English translation).
U.S. PTO Office Action for U.S. Appl. No. 10/767,649; dated Jul. 8, 2013; 9 pages.
U.S. Notice of Allowance and Fees Due for U.S. Appl. No. 11/687,009; dated Jul. 30, 2013; 7 pages.
USPTO Decision on Appeal for U.S. Appl. No. 11/687,009; dated Feb. 13, 2013, 8 pages.
JP Office Action for Application No. 2008-0679644; dated Dec. 3, 2013; 4 pages (w/ English translation).
CA Examiner's Report for Application No. 2,554,468; dated Nov. 26, 2013; 4 pages.
U.S. Notice of Allowance and Fees Due for U.S. Appl. No. 11/687,009; dated Mar. 6, 2014; 6 pages.
Granat, Creating an Environment for Mediating Disputes on the Internet, A Working Paper for the NCAIR on On-Line Dispute Resolution, May 22, 1996, pp. 1-9. See also www.unmass.edu/dispute/ncair/granat.htm.
Australian Examination Report for Application No. 2011250751 dated Mar. 13, 2014, 3 pages.
U.S. PTO Office Action for U.S. Appl. No. 13/041,353; dated May 21, 2014; 19 pages.
U.S. Notice of Allowance for U.S. Appl. No. 10/767,649; dated Jun. 23, 2014; 11 pages.
Zhongxing Ye, Yijun Zhang, "Application of Genetic Algorithm to Optimal Portfolio with Risk Control", vol. 1, pp. 351-354, Publishing House of Electron. Ind. (Beijing China).

\* cited by examiner

| Name | ID | Internal Desk ID | Preferred Comm. | Preferred Comm. Address | Customer(s) | Quoting Style |
|---|---|---|---|---|---|---|
| Dealer1 | ID1 | IND1 | IM | Dealer1@abc.com | CID1 | |
| Dealer2 | ID2 | IND1 | IM | Dealer2@abc.com | CID2 | |
| Trader1 | ID3 | IND3 | FAX | 212-555-5555 | CID3 | %Notional |
| Trader2 | ID4 | IND4 | FAX | 212-555-6666 | CID4 | % Notional |
| Exch1 | EX1 | - | FIX | | EC1 | Price |
| Exch2 | EX2 | - | FIX | | EC2 | Price |
| | | | | | | |

Fig. 3

| Name | ID | Firm | Address | Acct. | Preferred Comm. | Preferred Comm. Address | Trader |
|---|---|---|---|---|---|---|---|
| Cust1 | CID1 | ABC | 123 Third Ave. | 123456 | Voice | 212-555-7777 | ID1 |
| Cust2 | CID2 | ABC | 123 Third Ave. | 123457 | Email | Cust2@abc.com | ID2 |
| Cust3 | CID3 | DEF | 234 Park Ave. | 123458 | FAX | 212-555-8888 | ID3 |
| Cust4 | CID4 | DEF | 234 Park Ave. | 123459 | FAX | 212-555-9999 | ID4 |
| ExCus1 | EC1 | GHI Exchange | | 123460 | FIX | | EX1 |
| ExCus2 | EC2 | JKL Exchange | | 123461 | FIX | | EX2 |
| | | | | | | | |

Fig. 4

| Name | ID | Password | Security | Type | Group | Sector |
|---|---|---|---|---|---|---|
| Dealer1 | ID1 | IND1 | IBM | Options | | |
| Dealer2 | ID2 | IND1 | | | | |
| Trader1 | ID3 | IND3 | | | | |
| Trader2 | ID4 | IND4 | | | | |
| Exch1 | EX1 | - | | | | |
| Exch2 | EX2 | - | | | | |
| | | | | | | |

Fig. 5

| | | | | | Internal Market BBO | | | | | | |
|---|---|---|---|---|---|---|---|---|---|---|---|
| Sym | Structure | Exc/OTC | Quot Style | Quot Curr | Bid Cust | Bid Size | Bid | Ask | Ask Size | Ask Cust | |
| + ALV | Dec07 110 Put | E | € | EUR | CstB | 5000 | 1.4 | 1.65 | 5000 | CstA | |
| + BAY | Dec07 40-44 Strangle | E | € | EUR | Eurex | 10000 | 5.55 | 5.61 | 500 | CstD | |
| + BP | Jun07 600 Straddle | E | £ | GBP | CstA | 20000 | 65 | 65 | 500 | CstB | |
| + CS | Dec07 Variance Swap | O | % | EUR | CstC | 50000 | 25.5 | 26.0 | 25000 | CstA | |
| + DAX | Dec06 6250 Put | E | € | EUR | CstB | 2000 | 77 | 79.5 | 2000 | CstD | |
| + DAX | Jan07 Variance Swap | O | % | EUR | CstA | 50000 | 12.5 | 13.2 | 50000 | CstC | |
| + DBK | Dec07 90-114 CSpread | E | € | EUR | mmY | 90000 | 10.6 | 10.6 | 80000 | CstE | |
| + KSP | Dec08 90% Call | O | % | | CstF | 10 | 17.5 | 18.3 | 15 | CstG | |
| + UBS | Shares | E | $ | CHF | CstD | 25000 | 77 | 78 | 10000 | CstE | |
| + VOW | Jun07 80 Synthetic | O | € | EUR | CstC | 500 | 1.51 | 1.54 | 2000 | CstA | |

Internal & Public Exchanges BBO

Fig. 6

| | | | | | | BBO | | | | | | | |
|---|---|---|---|---|---|---|---|---|---|---|---|---|---|
| | | | | | | Liffe | | Internal Market | | | | | Liffe |
| Sym | Structure | Exc/OTC | Quot Style | Quot Curr | Bid Size | Bid | Bid Cust | Bid Size | Bid | Ask | Ask Size | Ask Cust | Ask | Ask Size |
| ALV | Dec07 110 Put | E | € | EUR | | | CstB | 5000 | 1.4 | 1.65 | 5000 | CstA | | |
| BAY | Dec07 40-44 Strangle | E | € | EUR | | | mmX | 10000 | 5.55 | 5.61 | 500 | CstD | | |
| BP | Jun07 600 Straddle | E | £ | GBP | 100 | 61 | CstA | 200 | 65 | 65 | 500 | *CstB* | 66 | *200* |
| CS | Dec07 Variance Swap | O | % | EUR | | | *CstC* | *50000* | 25.5 | 26.0 | 25000 | CstA | | |
| DAX | Dec06 6250 Put | E | € | EUR | | | CstB | 2000 | 77 | 79.5 | 2000 | CstD | | |
| DAX | Jan07 Variance Swap | O | % | EUR | | | CstA | 50000 | 12.5 | 13.2 | 50000 | CstC | | |
| DBK | Dec07 90-114 CSpread | E | € | EUR | | | mmY | 90000 | 10.6 | 10.6 | *80000* | *CstE* | | |
| KSP | Dec08 90% Call | O | % | EUR | | | CstF | 10 | 17.5 | 18.3 | 15 | CstG | | |
| UBS | Shares | E | $ | CHF | | | *CstD* | *25000* | 77 | 78 | 10000 | CstE | | |
| VOW | Jun07 80 Synthetic | O | € | EUR | | | CstC | 500 | 1.51 | 1.54 | 2000 | CstA | | |

Internal & 1 Public Exchange (Euronext.Liffe) BBOs

Fig. 7

|  |  |  |  |  | BBO | | | | | | | | |
|---|---|---|---|---|---|---|---|---|---|---|---|---|---|
|  |  |  |  |  | Liffe | | Internal Market | | | | | Liffe | |
| Sym | Structure | Exc/OTC | Quot Style | Quot Curr | Bid Size | Bid | Bid Cust | Bid Size | Bid | Ask | Ask Size | Ask Cust | Ask | Ask Size |
| + ALV | Dec07 110 Put | E | € | EUR |  |  | CstB | 5000 | 1.4 | 1.65 | 5000 | CstA |  |  |
| + BAY | Dec07 40-44 Strangle | E | € | EUR |  |  | mmX | 10000 | 5.55 | 5.61 | 500 | CstD |  |  |
|  |  |  |  |  |  |  |  |  |  | 67 | 400 | mmY | 66 | 200 |
| + |  |  |  |  |  |  |  |  |  | 65 | 250 | mmX |  |  |
| - BP | Jun07 600 Straddle | E | £ | GBP |  |  | CstA | 200 | 65 | 65 | 250 | CstB |  |  |
|  |  |  |  |  |  |  | CstA | 200 | 65 | 65 | 500 | CstB |  |  |
|  |  |  |  |  |  |  | mmX | 100 | 63 |  |  |  |  |  |
| + |  |  |  |  | 100 | 61 |  |  |  |  |  |  |  |  |
| + CS | Dec07 Variance Swap | O | % | EUR |  |  | mmY | 200 | 60 |  |  |  |  |  |
| + DAX | Dec06 6250 Put | E | € | EUR |  |  | CstC | 50000 | 25.5 | 26.0 | 25000 | CstA |  |  |
| + DAX | Jan07 Variance Swap | O | % | EUR |  |  | CstB | 2000 | 77 | 79.5 | 2000 | CstD |  |  |
| + DBK | Dec07 90-114 CSpread | E | € | EUR |  |  | CstA | 50000 | 12.5 | 13.2 | 50000 | CstC |  |  |
| + KSP | Dec08 90% Call | O | % | CHF |  |  | mmY | 90000 | 10.6 | 10.6 | 80000 | CstE |  |  |
| + UBS | Shares | E | $ | EUR |  |  | CstF | 10 | 17.5 | 18.3 | 15 | CstG |  |  |
| + VOW | Jun07/80 Synthetic | O | € | EUR |  |  | CstD | 25000 | 77 | 78 | 10000 | CstE |  |  |
|  |  |  |  |  |  |  | CstC | 500 | 1.51 | 1.54 | 2000 | CstA |  |  |

Fig. 8

Internal & 1 Public Exchange (Euronext.Liffe) BBOs with 1 Internal Depth Shown (Converging)

| | Sym | Structure | Exc/OTC | Quot Style | Quot Curr | Liffe Bid Size | Liffe Bid | Bid Cust | Internal Market Bid Size | Internal Market Bid | Internal Market Ask | Internal Market Ask Size | Internal Market Ask Cust | Liffe Ask | Liffe Ask Size |
|---|---|---|---|---|---|---|---|---|---|---|---|---|---|---|---|
| + | ALV | Dec07 110 Put | E | € | EUR | | | CstB | 5000 | 1.4 | 1.65 | 5000 | CstA | | |
| + | BAY | Dec07 40-44 Strangle | E | € | EUR | | | mmX | 10000 | 5.55 | 5.61 | 500 | CstD | | |
| + | | | | | | | | | | | 67 | 400 | mmY | 66 | 200 |
| - | BP | Jun07 600 Straddle | E | £ | GBP | | | CstA | 200 | 65 | 65 | 250 | mmX | | |
| | | | | | | | | CstA | 200 | 65 | 65 | 250 | CstB | | |
| | | | | | | | | mmX | 100 | 63 | 65 | 500 | CstB | | |
| ı | | | | | | 100 | 61 | | | | | | | | |
| ı | | | | | | 500 | 60 | | | | | | | | |
| ı | | | | | | | | mmY | 200 | 60 | | | | | |
| ı | | | | | | 400 | 59 | | | | | | | | |
| | | | | | | 1000 | 58 | | | | | | | | |
| + | CS | Dec07 Variance Swap | O | % | EUR | | | CstC | 50000 | 25.5 | 26.0 | 25000 | CstA | | |
| + | DAX | Dec06 6250 Put | E | € | EUR | | | CstB | 2000 | 77 | 79.5 | 2000 | CstD | | |
| + | DAX | Jan07 Variance Swap | O | % | EUR | | | CstA | 50000 | 12.5 | 13.2 | 50000 | CstC | | |
| + | DBK | Dec07 90-114 CSpread | E | € | EUR | | | mmY | 90000 | 10.6 | 10.6 | 80000 | CstE | | |
| + | KSP | Dec08 90% Call | O | % | EUR | | | CstF | 10 | 17.5 | 18.3 | 15 | CstG | | |
| + | UBS | Shares | E | $ | CHF | | | CstD | 25000 | 77 | 78 | 10000 | CstE | | |
| + | VOW | Jun07 80 Synthetic | O | € | EUR | | | CstC | 500 | 1.51 | 1.54 | 2000 | CstA | | |

Internal & 1 Public Exchange (Euronext.Liffe) BBOs with 1 Internal & 1 Public Exchange Depth Shown
(Converging)

Fig. 9

|   | Sym | Structure | Exc/OTC | Quot Style | Quot Curr | Liffe Bid Size | Liffe Bid | Bid Cust | Bid Size | Bid | Ask | Ask Size | Ask Cust | Liffe Ask | Liffe Ask Size |
|---|---|---|---|---|---|---|---|---|---|---|---|---|---|---|---|
| + | ALV | Dec07 110 Put | E | € | EUR |   |   | CstB | 5000 | 1.4 | 1.65 | 5000 | CstA |   |   |
| + | BAY | Dec07 40-44 Strangle | E | € | EUR |   |   | mmX | 10000 | 5.55 | 5.61 | 500 | CstD |   |   |
| - | BP | Jun07 600 Straddle | E | £ | GBP |   |   | CstA | 200 | 65 | 65 | 500 | *CstB* |   |   |
|   |   |   |   |   |   |   |   | CstA | 200 | 65 | 65 | 250 | CstB |   |   |
|   |   |   |   |   |   | 100 | 61 | mmX | 100 | 63 | 65 | 250 | mmX | 66 | *200* |
| + | CS | Dec07 Variance Swap | O | % | EUR |   |   | mmY | 200 | 60 | 67 | 400 | mmY |   |   |
| + | DAX | Dec06 6250 Put | E | € | EUR |   |   | *CstC* | *50000* | 25.5 | 26.0 | 25000 | CstA |   |   |
| + | DAX | Jan07 Variance Swap | O | % | EUR |   |   | CstB | 2000 | 77 | 79.5 | 2000 | CstD |   |   |
| + | DBK | Dec07 90-114 CSpread | E | € | EUR |   |   | CstA | 50000 | 12.5 | 13.2 | 50000 | CstC |   |   |
| + | KSP | Dec08 90% Call | O | % |   |   |   | mmY | 90000 | *10.6* | *10.6* | *80000* | *CstE* |   |   |
| + | UBS | Shares | E | $ | CHF |   |   | CstF | 10 | 17.5 | 18.3 | 15 | CstG |   |   |
| + | VOW | Jun07 80 Synthetic | O | € | EUR |   |   | *CstD* | *25000* | 77 | 78 | 10000 | CstE |   |   |
|   |   |   |   |   |   |   |   | CstC | 500 | 1.51 | 1.54 | 2000 | CstA |   |   |

Fig. 10

Internal & 1 Public Exchange (Euronext.Liffe) BBOs with 1 Internal Depth Shown (Side-By-Side)

| Sym | Structure | Exc/OTC | Quot Style | Quot Curr | Liffe Bid Size | Liffe Bid | Internal Market Bid Cust | Internal Market Bid Size | Internal Market Bid | Internal Market Ask | Internal Market Ask Size | Internal Market Ask Cust | Liffe Ask | Liffe Ask Size |
|---|---|---|---|---|---|---|---|---|---|---|---|---|---|---|
| ALV | Dec07 110 Put | E | € | EUR | | | CstB | 5000 | 1.4 | 1.65 | 5000 | CstA | | |
| BAY | Dec07 40-44 Strangle | E | € | EUR | | | mmX | 10000 | 5.55 | 5.61 | 500 | CstD | | |
| BP | Jun07 600 Straddle | E | £ | GBP | | | CstA | 200 | 65 | 65 | 500 | *CstB* | | |
| | | | | | | | CstA | 200 | 65 | 65 | 250 | CstB | | |
| | | | | | 100 | 61 | mmX | 100 | 63 | | 250 | mmX | 66 | 200 |
| | | | | | 500 | 60 | | | | | | | | |
| | | | | | 400 | 59 | mmY | 200 | 60 | 67 | 400 | mmY | | |
| | | | | | *1000* | 58 | | | | | | | | |
| CS | Dec07 Variance Swap | O | % | EUR | | | *CstC* | *50000* | 25.5 | 26.0 | 25000 | CstA | | |
| DAX | Dec06 6250 Put | E | € | EUR | | | CstB | 2000 | 77 | 79.5 | 2000 | CstD | | |
| DAX | Jan07 Variance Swap | O | % | EUR | | | CstA | 50000 | 12.5 | 13.2 | 50000 | CstC | | |
| DBK | Dec07 90-114 CSpread | E | € | EUR | | | mmY | 90000 | 10.6 | 10.6 | *80000* | *CstE* | | |
| KSP | Dec08 90% Call | O | % | EUR | | | CstF | 10 | 17.5 | 18.3 | 15 | CstG | | |
| UBS | Shares | E | $ | CHF | | | *CstD* | *25000* | 77 | 78 | 10000 | CstE | | |
| VOW | Jun07 80 Synthetic | O | € | EUR | | | CstC | 500 | 1.51 | 1.54 | 2000 | CstA | | |

Fig. 11

Internal & 1 Public Exchange (Euronext.Liffe) BBOs with 1 Internal & 1 Public Exchange Depth Shown (Side-By-Side)

Internal Market BBO

| | Sym | Structure | Exc/OTC | Quot Style | Quot Curr | Bid Cust | Bid Size | Bid | Ask | Ask Size | Ask Cust |
|---|---|---|---|---|---|---|---|---|---|---|---|
| + | ALV | Dec07 110 Put | E | € | EUR | CstB | 5000 | 1.4 | 1.65 | 5000 | CstA |
| + | BAY | Dec07 40-44 Strangle | E | € | EUR | Eurex | 10000 | 5.55 | 5.61 | 500 | CstD |
| | | | | | | | | | 67 | 400 | mmY |
| + | | | | | | | | | 66 | *200* | *Liffe* |
| | | | | | | | | | 65 | 250 | mmX |
| - | BP | Jun07 600 Straddle | E | £ | GBP | CstA | 200 | 65 | 65 | 250 | CstB |
| | | | | | | CstA | 200 | 65 | 65 | *500* | *CstB* |
| | | | | | | mmX | 100 | 63 | 64 | 10 | |
| + | | | | | | Liffe | 100 | 61 | | | |
| | | | | | | mmY | 200 | 60 | | | |
| + | CS | Dec07 Variance Swap | O | % | EUR | *CstC* | *50000* | 25.5 | 26.0 | 25000 | CstA |
| + | DAX | Dec06 6250 Put | E | € | EUR | CstB | 2000 | 77 | 79.5 | 2000 | CstD |
| + | DAX | Jan07 Variance Swap | O | % | EUR | CstA | 50000 | 12.5 | 13.2 | 50000 | CstC |
| + | DBK | Dec07 90-114 CSpread | E | € | EUR | mmY | 90000 | 10.6 | 10.6 | *80000* | *CstE* |
| + | KSP | Dec08 90% Call | O | % | CHF | CstF | 10 | 17.5 | 18.3 | 15 | CstG |
| + | UBS | Shares | E | $ | CHF | *CstD* | *25000* | 77 | 78 | 10000 | CstE |
| + | VOW | Jun07 80 Synthetic | O | € | EUR | CstC | 500 | 1.51 | 1.54 | 2000 | CstA |

Fig. 12 A

Internal & Public Exchanges BBO with 1 Internal Depth Shown (Converging)

| | | | | | Internal Market BBO | | | | | |
|---|---|---|---|---|---|---|---|---|---|---|
| Sym | Structure | Exc/OTC | Quot Style | Quot Curr | Bid Cust | Bid Size | Bid | Ask | Ask Size | Ask Cust |
| + ALV | Dec07 110 Put | E | € | EUR | CstB | 5000 | 1.4 | 1.65 | 5000 | CstA |
| + BAY | Dec07 40-44 Strangle | E | € | EUR | Eurex | 10000 | 5.55 | 5.61 | 500 | CstD |
| | | | | | | | | 67 | 400 | mmY |
| + | | | | | | | | 66 | 200 | *Liffe* |
| | | | | | | | | 65 | 250 | mmX |
| | | | | | | | | 65 | 250 | CstB |
| - BP | Jun07 600 Straddle | E | £ | GBP | CstA | 200 | 65 | 65 | 500 | CstB |
| | | | | | CstA | 200 | 65 | | | |
| | | | | | mmX | 100 | 63 | | | |
| ı | | | | | Liffe | 100 | 61 | | | |
| ı | | | | | Liffe | 500 | 60 | | | |
| ı | | | | | mmY | 200 | 60 | | | |
| ı | | | | | Liffe | 400 | 59 | | | |
| ı | | | | | *Liffe* | *1000* | 58 | | | |
| + CS | *Dec07 Variance Swap* | O | % | EUR | CstC | 50000 | 25.5 | 26.0 | 25000 | CstA |
| + DAX | Dec06 6250 Put | E | € | EUR | CstB | 2000 | 77 | 79.5 | 2000 | CstD |
| + DAX | *Jan07 Variance Swap* | O | % | EUR | CstA | 50000 | 12.5 | 13.2 | 50000 | CstC |
| + DBK | Dec07 90-114 CSpread | E | € | EUR | mmY | 90000 | 10.6 | *10.6* | *80000* | *CstE* |
| + KSP | *Dec08 90% Call* | O | % | CHF | CstF | 10 | 17.5 | 18.3 | 15 | CstG |
| + UBS | Shares | E | $ | | *CstD* | *25000* | 77 | 78 | 10000 | CstE |
| + VOW | *Jun07 80 Synthetic* | O | € | EUR | CstC | 500 | 1.51 | 1.54 | 2000 | CstA |

Fig. 12 B

Internal & Public Exchanges BBO with 1 Internal & 1 Public Exchange Depth Shown (Converging)

Internal Market BBO

| Sym | Structure | Exc/OTC | Quot Style | Quot Curr | Bid Cust | Bid Size | Bid | Ask | Ask Size | Ask Cust |
|---|---|---|---|---|---|---|---|---|---|---|
| + | ALV | Dec07 110 Put | E | € | EUR | CstB | 5000 | 1.4 | 1.65 | 5000 | CstA |
| + | BAY | Dec07 40-44 Strangle | E | € | EUR | Eurex | 10000 | 5.55 | 5.61 | 500 | CstD |
| - | BP | Jun07 600 Straddle | E | £ | GBP | CstA | 200 | 65 | 65 | 500 | CstB |
|   |   |   |   |   |   | mmX | 200 | 65 | 65 | 250 | CstB |
|   |   |   |   |   |   | Liffe | 100 | 63 | 65 | 250 | mmX |
| + |   |   |   |   |   | mmY | 200 | 61 | 66 | 200 | Liffe |
| + | CS | Dec07 Variance Swap | O | % | EUR | CstC | 50000 | 60 | 67 | 400 | mmY |
| + | DAX | Dec06 6250 Put | E | € | EUR | CstB | 2000 | 25.5 | 26.0 | 25000 | CstA |
| + | DAX | Jan07 Variance Swap | O | % | EUR | CstA | 50000 | 77 | 79.5 | 2000 | CstD |
| + | DBK | Dec07 90-114 CSpread | E | € | EUR | mmY | 90000 | 12.5 | 13.2 | 50000 | CstC |
| + | KSP | Dec08 90% Call | O | % | EUR | CstF | 10 | 10.6 | 10.6 | 80000 | CstE |
| + | UBS | Shares | E | $ | CHF | CstD | 25000 | 17.5 | 18.3 | 15 | CstG |
| + | VOW | Jun07 80 Synthetic | O | € | EUR | CstC | 500 | 77 | 78 | 10000 | CstE |
|   |   |   |   |   |   |   |   | 1.51 | 1.54 | 2000 | CstA |

Internal & Public Exchanges BBO with 1 Internal Depth Shown (Side-By-Side)

Fig. 13

| | | | | | Internal Market BBO | | | | | | |
|---|---|---|---|---|---|---|---|---|---|---|---|
| | Sym | Structure | Exc/OTC | Quot Style | Quot Curr | Bid Cust | Bid Size | Bid | Ask | Ask Size | Ask Cust |
| + | ALV | Dec07 110 Put | E | € | EUR | CstB | 5000 | 1.4 | 1.65 | 5000 | CstA |
| + | BAY | Dec07 40-44 Strangle | E | € | EUR | Eurex | 10000 | 5.55 | 5.61 | 500 | CstD |
| − | BP | Jun07 600 Straddle | E | £ | GBP | CstA | 200 | 65 | 65 | 500 | *CstB* |
| | | | | | | CstA | 200 | 65 | 65 | 250 | CstB |
| ± | | | | | | mmX | 100 | 63 | 65 | 250 | mmX |
| − | | | | | | Liffe | 100 | 61 | 66 | *200* | *Liffe* |
| − | | | | | | Liffe | 500 | 60 | 67 | 400 | mmY |
| − | | | | | | mmY | 200 | 60 | | | |
| | | | | | | Liffe | 400 | 59 | | | |
| | | | | | | *Liffe* | *1000* | *58* | | | |
| + | CS | Dec07 Variance Swap | O | % | EUR | *CstC* | *50000* | *25.5* | *26.0* | *25000* | CstA |
| + | DAX | Dec06 6250 Put | E | € | EUR | CstB | 2000 | 77 | 79.5 | 2000 | CstD |
| + | DAX | Jan07 Variance Swap | O | % | EUR | CstA | 50000 | 12.5 | 13.2 | 50000 | CstC |
| + | DBK | Dec07 90-114 CSpread | E | € | EUR | mmY | 90000 | *10.6* | *10.6* | *80000* | *CstE* |
| + | KSP | Dec08 90% Call | O | % | | CstF | 10 | 17.5 | 18.3 | 15 | CstG |
| + | UBS | Shares | E | $ | CHF | *CstD* | *25000* | 77 | 78 | 10000 | CstE |
| + | VOW | Jun07 80 Synthetic | O | € | EUR | CstC | 500 | 1.51 | 1.54 | 2000 | CstA |

Fig. 14

Internal & Public Exchanges BBO with 1 Internal & 1 Public Exchange Depth Shown (Side-By-Side)

METHODS AND SYSTEMS FOR MANAGING AND TRADING USING A SHARED ORDER BOOK AS INTERNAL EXCHANGE

This Application claims the benefit of U.S. Provisional Application No. 60/882,905, filed Dec. 30, 2006, entitled "Methods and Systems for Managing and Trading Using A Shared Order Book as Internal Exchange", which is hereby incorporated by reference herein in its entirety.

BRIEF DESCRIPTION OF THE FIGURES

FIGS. 3-14 illustrate interface screens for use with at least one of the methods and systems disclosed herein.

DETAILED DESCRIPTION OF THE INVENTION

Figure 1:
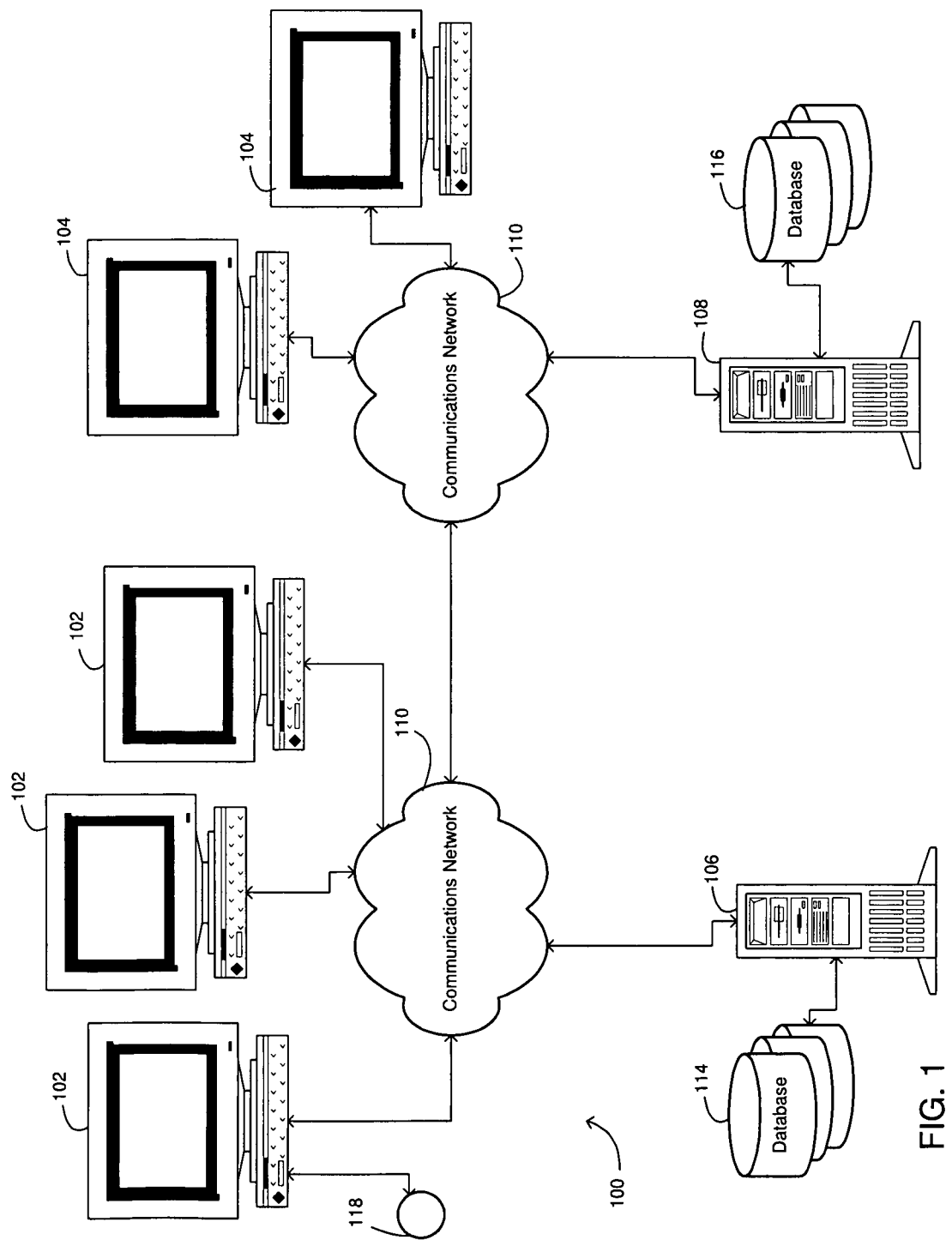
FIG. 1 illustrates a system according to at least one embodiment of the systems disclosed herein.

The following sections I-X provide a guide to interpreting the present application.

I. Terms

The following sections I-X provide a guide to interpreting the present application.

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

II. Overview of Various Embodiments

Referring to FIG. 1, a system 100 according to at least one embodiment of the systems disclosed herein includes at least one computing device, such as a remote computer 106, 108, e.g., a server computer, a client computer 102, 104, or a combination thereof. The term remote in this context merely means that the remote computer 106, 108 and at least one of the client computers 102, 104 are separate devices. Thus, the devices may be remote even if they are located within the same room. In at least one embodiment, the system includes at least one internal exchange computer 106 that is connected over a communication network 110 to one or a plurality of internal client computers 102 and at least one external exchange computer 108. The external exchange computer 108 may further be connected to an external client computer 104. One or more of the internal client computers 102 may be connected to the internal exchange computer 106 through a firewall.

The system 100 may be implemented over any type of communications network 110, such as a local area network (LAN), a wide area network (WAN), the Internet, a telephone network (POTS), a wireless network, including cellular, WiFi, and WiMax networks, or a combination of wired and/or wireless networks. In certain instances, the communications network 110 may be independent of the Internet or limited with respect to the type of the information transmitted over the Internet, such as to information that poses little or no security risk if misappropriated or that has been encrypted.

In the networked embodiment, internal client computers 102 are preferably configured or otherwise capable of transmitting and/or receiving communications to and/or from the internal exchange computer 106. This may be accomplished with a communication element, such as a modem, an Ethernet interface, a transmitter/receiver, etc., that enables communication with a similarly equipped internal exchange computer 106, wirelessly, wired, or a combination thereof. It is understood that the relative functionality described herein may be provided by the exchange computer 106, by the client computer 102, or both, and is thus not limited to any particular one of the implementations discussed herein. In at least one embodiment, the client computers 102 will generally provide the front-end functionality and the internal exchange computer 106 will provide the back-end functionality.

The term internal and external generally denote belonging to one of two groups. One belongs to an internal group if one or more criteria are satisfied that define the internal group. One belongs to the external group if the one or more criteria are not satisfied. Various types of criteria may define the internal group, including memberships or affiliations. Grouping may also be hardware specific as well as individual specific. For instance, the internal group may include some or all employees of a company, members of an organization, or members of any other collective. Similarly, the internal group may include all individuals authorized to access the functionality of the system 100 as described herein. For example, the internal group may include all equity derivative traders of a company or equity derivative traders that subscribe to the trading services provided by the company. Alternatively or additionally, the internal group may include all equity derivative traders authorized to access the backend functionality provided by the internal exchange computer 106. Although various embodiments may be described herein in relation to equity derivatives, it is understood that the methods and systems disclosed herein are equally applicable to other types of financial instruments as well as non-financial instrument items and is thus not limited thereto. The term "financial instrument" denotes any instrument, issued by a corporation, government, or any other entity, that evinces dept or equity, and any derivative thereof, including stocks, bonds, debentures, certificates of interest or deposit, warrants, options, futures, forwards, swaps, or generally any security.

The computing device, e.g., the client computers 102, 104 and/or the exchange computers 106, 108, generally include at least one processor, and a memory, such as ROM, RAM, FLASH, etc., or any computer readable medium, such as a hard drive, a flash-drive, an optical or magnetic disk, etc. The memory or computer readable medium preferably includes software stored thereon that when executed performs one or more steps of the methods disclosed herein, including communicating data and commands back and forth between the computers, displaying interface screens, etc. The computers may also be associated with or have access to one or more databases 114, 116 for retrieving and/or storing the various types of data discussed herein, including identity verification data, such as an ID and password, biometric data, etc., internal and/or external trade/order and market data, account data, communication preferences, templates, professed interest, historic data, user preferences, etc.

The client computers 102, 104 may include, without limitation, a mobile phone, PDA, pocket PC, personal computer, as well as any special or other general purpose computing device. As such, the client computer 102, 104 preferably includes a processor, a memory, a display, such as a CRT or an LCD monitor, for displaying information and/or graphics associated with the functionality provided by the system 100, and at least one input device, such as a mouse, a touch-sensitive pad, a pointer, a stylus, a trackball, a button or a plurality of buttons, e.g., alphanumeric, a scroll wheel, a touch-sensitive monitor, etc., or a combination thereof, for users to enter commands and/or information relevant to the system's functionality. With the general purpose type of client computer 102, 104, such as the PC or PDA, users may access the functionality provided by the system 100 with a browser application or any other generic application, or with special purpose software designed specifically for accessing the functionality disclosed herein.

In at least one embodiment, the internal client computer 102 includes or is otherwise associated with at least one biometric sensor 118. The biometric sensor 118 is any device that is used to determine directly from the user at least one item of biometric data associated with a user, such as a fingerprint reader, an iris scanner, a retinal scanner, a vascular pattern reader, a facial recognition camera, etc. The biometric sensor 118 may be embodied in hardware, software, or a combination thereof. The biometric sensor 118 may further share resources with other components of the client computer 102, such as the processor, memory, a camera, a microphone, a speaker, etc. A single biometric sensor 118 may be used for reading more than one type of biometric data. For example, a digital camera may be used to obtain an image of the user's eye for iris scanning and an image of the user's face for facial recognition. In this instance, a single image capture of the user's face may provide the data for facial recognition as well as data for iris or retinal comparisons.

The biometric data is generally obtained with the biometric sensor 118 and used at least to authenticate the identity of the user as a gateway for allowing the user to access the system's functionality. In this regard, biometric data may be compared with previously obtained/stored biometric data that has preferably been verified as being associated with a particular user and access to the system's functionality may be provided based on a positive match thereof.

In at least one embodiment, the system 100 provides functions relevant to trading financial instruments or other items in a plurality of exchanges, such as an internal exchange, e.g., an over the counter (OTC) exchange, and at least one external exchange, e.g., a public exchange, an external (OTC) exchange, an electronic communication network (ECN), etc. The internal exchange generally includes or otherwise supports at least one or a plurality of the internal markets. In this respect, the system 100 allows users, such as traders, brokers, dealers, customers, market makers, etc., to access market data and submit orders to the internal and/or external exchange using at least one client computer 102, 104. The term orders as used herein includes actual orders, such as bids, offers, buys, sells, requests for quotes (RFQs), quotes, etc., and indications of interest (IOIs), etc. It is understood that a user may be acting in a principal or agency capacity. Therefore, the acts disclosed herein as being performed by a user, include acts of the principle and acts of the agent. For example, when referring to a user submitting an IOI or order, this includes a broker submitting an IOI or order for a customer as well as the customer submitting the IOI or order on his own behalf.

An indication of interest (IOI) includes any expression indicating that the submitting party or a customer thereof is interested in an item, which generally includes any communication relating to a tradeable or traded item that is not a quote, a buy, sell, bid, or offer. An IOI therefore specifies at least one trading variable, such as the item name or symbol, whether a buy side or sell interest, the size of the interest, the price, etc. IOIs differ from actual orders in that the IOI is not a firm order, just an indication of one. In certain instances, IOIs may be missing at least one of the trading variables. For example, an IOI may specify an item name, symbol, or description, e.g., IBM. In this instance, the IOI indicates broadly that a user is interested in IBM without any indication whether the user is interested in buying or selling, the price, or the size of the interest. The IOI does not even need to identify any specific item. Rather, the IOI may identify items by type or any other common data item between the items. For example, a user may submit an IOI that indicates an interest to buy or sell derivatives on large cap underlyiers.

Figure 2:
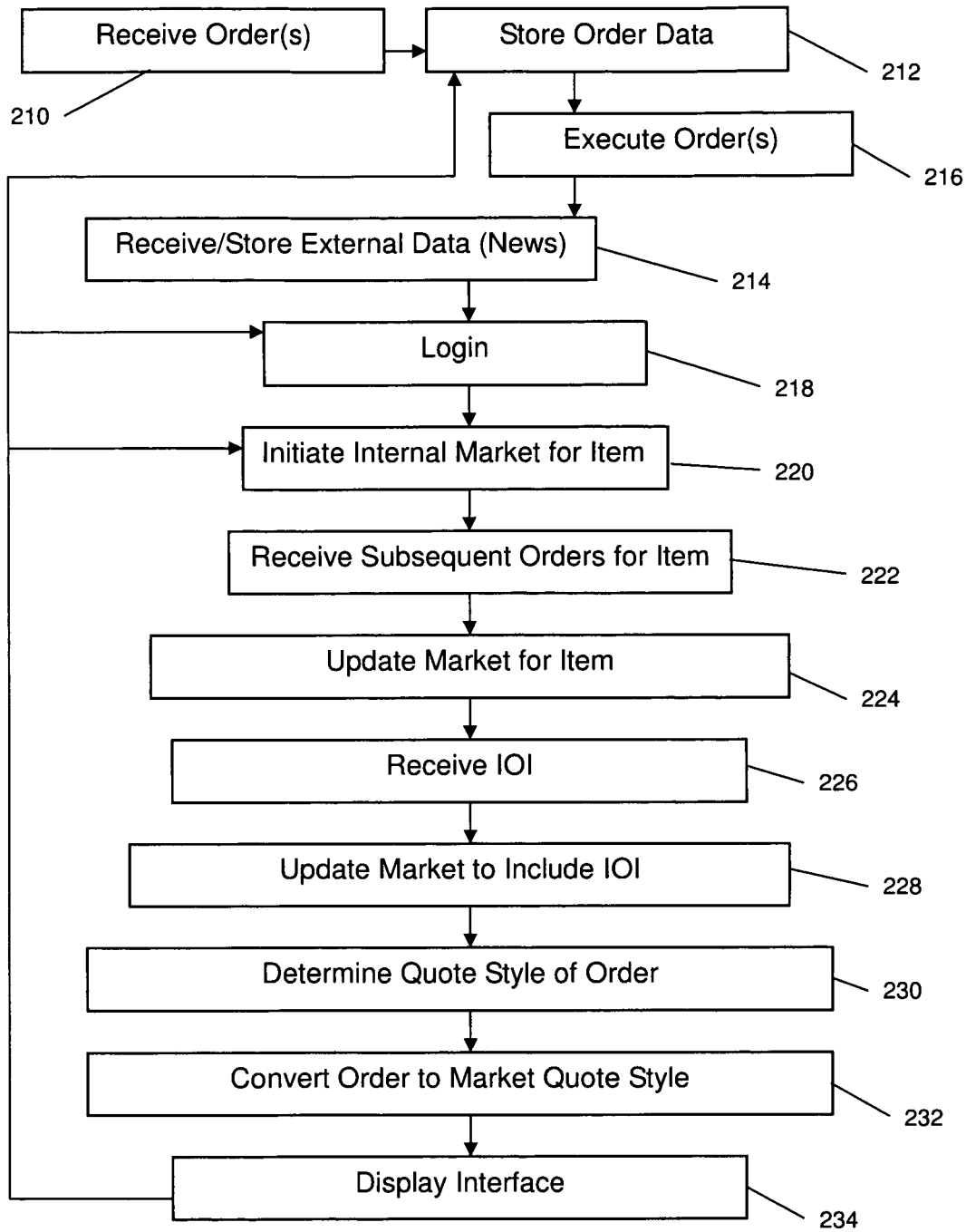
FIGS. 2 and 15-17 illustrate methods according to at least one embodiment of the methods disclosed herein.

Referring to FIG. 2, the system 100 generally receives at 210 and stores at 212 the internal orders in one or more databases to provide a shared order book. The system 100 also receives external orders, such as bids, offers, quotes, IOIs, etc., submitted to the one or more external exchanges, or data related thereto, such as news, at 214. The system 100 groups orders for particular items, e.g., financial instruments, to create a market for each item that includes at least one of internal orders and external orders for the item. The market for each item may be managed or worked by users on a manual, a semi-automatic, or an automated exchange. That is, orders may be executed with the system at 216, either automatically and/or manually.

Individual user sessions for access to the relevant functionality of the system 100 may begin with a user logging into the system at 218. That is, a user may login to place one or more orders for execution, view or otherwise access market data for one or more items, and/or query the system 100 for the particular items of data maintained by the system 100. Login generally entails receiving identification information from the user, such as a login ID, password, biometric data, etc., and verifying therewith that the user is authorized to access the relevant functionality of the system 100.

In at least one embodiment, the system 100 thereafter causes an interface screen to be displayed at 240, such as at least one of the shared order book interface screens shown in FIGS. 6-14. Generally, an initial order, e.g., an actual order or IOI, placed in the system 100 via the internal client computer 102 marks the start of an internal market at 220 that is defined by the one or more items that are the subject of the order, e.g., one or more financial instruments, and optionally the structure and/or metadata of the order for the one or more items. The system 100 may then group subsequent internal and/or external orders received at 222 with the initiating order to update and further define the particular market continually, e.g., in real time, at 224. In instances when the initiating order is no longer pending, either because the order was cancelled, revised, or filled, the system 100 may group subsequent orders with preceding orders for the one or more items. As such, users may revise or cancel any existing IOI/actual order, including revising an IOI to be an actual order, an order in an internal market to hit that market's best bid or offer, or to match the price, side, and/or size of another order, on the same side or otherwise, or in the reverse.

The system 100 may also group orders received at 226 with no size and/or price specified, e.g., IOIs, with the initiating order or any prior orders at 228. Orders may be grouped and/or sorted in this respect by any variable relevant to trading the item, such as price, size, e.g., to distinguish between largest and smaller sized orders at the same price, time, e.g., to distinguish between the first and subsequent orders for the same price, a quality associated with the order, etc. In instances where the market is further delineated by users, e.g., customers, any subsequent orders for a particular user or customer that match an existing order for that user or customer, respectively, may be grouped with the existing order.

The system 100 may also determine internal best-bid-best-offer (internal BBO or IBBO) data for the internal market, which includes at least one of the best bid price, total best bid size, best ask price, and total best ask size. The total best bid and ask sizes are generally an aggregate of the best price buy and sell orders, e.g., bids and offers. An IOI is generally excluded from the IBBO since IOI pricing is merely indicative. For items listed on an external exchange, e.g., not originating in the internal OTC, external orders may be deemed to be orders in the internal market for the purpose of determining the IBBO, both when the external exchange directly supports the structure type of the item in the internal market and when it only supports component legs of the structure type of the item in the internal market, in which case it will indirectly support such structure types of the internal market via synthetically using the component legs available on the external exchange. Thus, the best bid and ask sizes are, in this instance, an aggregate of the best price external and internal buy and sell orders, if any. The IBBO may be the best BBO irrespective of internal/public source. That is, the IBBO may be the external best-bid and best-offer (EBBO) when the best prices are public only. The best bid/ask customer may in this instance simply be the public exchange.

Order sizes may be aggregated at price levels other than the IBBO, EBBO, or any other BBO price as well as for a plurality of a user's customers. Filled, revised, and cancelled orders may be removed from the market and, where applicable, from any BBO determinations. Filled orders may be added to a running calculation of that market's total traded, last trade price, and average trade price. The running calculations may be specific to internal orders, external orders, or a combination thereof. Internal exchange data and statistics can be used to provide quick markets to users and may have a value all their own, e.g., as market data, valuation data, etc., for sale to external markets and/or users.

Each market in an exchange, e.g., the internal exchange, external exchange, or the combined exchange, therefore has a market depth. Market depth on the exchange has a depth that includes the initial order for the item, and resulting and/or subsequent orders for the item, e.g., bids, offers, quotes, IOIs, etc., if pending. Market depth for the combined exchange includes orders from a plurality of exchanges. For example, for combined exchanges including orders from an internal market and orders from an external market, the depth includes both internal and external orders, if any.

Data from steps 210-216 generally provide at least a portion of the information for providing a shared order book as discussed herein. Various types of data may be maintained in this respect, such as the item name and/or symbol, size, price, execution date and/or time, posting date and/or time, buyer/seller name and/or identification number, account numbers, order type, relevant exchange if from an external source, etc., for orders submitted to and for trades executed with the system 100, and data derived therefrom.

In at least one embodiment, the system maintains for each user, e.g., trader, dealer, broker, etc., a record in at least one User Master database that includes at least one of: the user name, contact information, a user ID, e.g., a dealer or trader ID, an internal desk ID, and one or more communications addresses, e.g., voice, fax, e-mail, instant message (IM), financial information eXchange (FIX) protocol, execution management system (EMS), and associations with other users, traders, and/or customers. In instances where the user trades on behalf of a customer, each customer has a record in at least one database that includes at least one of: the customer name, contact information, a customer ID, and account details, e.g., firm name, address, account #s, traders/dealers associated with the customer, etc., and optionally additional records linked to it as sub-accounts. One or more databases may also be maintained that associates the users and/or customers with one or more groups or sectors. The system 100 may further store user communication preferences that specify the manner in which users are presented with trading opportunities or other communications, such as by phone call, email, IM, fax, etc. The system may also maintain at least one database with order/trade history and position data stored therein for users and/or their customers.

In one embodiment, internal traders, e.g., dealer/broker, have a record in a Trader Master database with a unique trader ID, internal desk ID, and communications addresses, such as voice, fax, e-mail, IM, FIX, EMS, etc. addresses, specified, as shown in FIG. 3. Customers may also have a record in the Customer Master database with unique customer ID and master account details, e.g., firm name, address, account #s, and optionally additional records linked to it as sub-accounts, as shown in FIG. 4. Traders associated with customers may also have a record in the Trader Master database with a unique trader ID, a customer ID, e.g., for the customer they trade for, communications addresses and preferences, e.g., voice, fax, e-mail, IM, FIX, EMS, etc., and one or more internal trader IDs used to indicate the internal trader, e.g., dealer/broker, who covers that trader associated with a customer. Customer records in the Customer Master database may have one or more trader records in the Trader Master linked by unique customer ID representing the customer's traders. Every private/public exchange, montage, ECN, and/or feed represented in the system may also have a record in the Customer Master database with a unique customer ID and master account details, and a record in the Trader Master database with a unique trader ID, communications addresses, and preferences linked by the unique customer ID to the Customer Master database/record in order to represent the source of, e.g., an order, quote, price, trades, or any other data, from an order as resulting from a private/public exchange's, montage's, ECN's, or feed's data. An Interest Matrix database, which includes data such as sector and group classifications for particular users and/or customers, professed interest in various securities, security types, sectors, groups, trade/order history, etc., as shown in FIG. 5, may also be maintained.

The databases may be maintained with manual entries of new records and editing of existing records. That is, users, such as dealers, brokers, and traders, may add customer and potential counterparty records, which may include the customer's and potential counterparty communications addresses. An indication may be provided specifying which communications address the customer or potential counterparty prefers to use. In one embodiment, users may also specify and associate individual securities, sectors, and/or groups with the user based on the user's interest or coverage. With regard to the trade/order history database(s), the records therein may be updated automatically with the, e.g., execution, cancellation, submission, etc., of orders within the system.

In one embodiment, the system 100 supports multiple quoting styles. That is, the trading system 100 allows users to submit and/or view orders in one or more of a plurality of different quoting styles, such as price and size, % notional and notional, % volatility and vega notional, etc. The system 100 may also be flexible in that it allows users to submit orders in either style. In this instance, the system 100 will determine the quoting style of the order at 230 and convert the order at 232 from the submitted quoting style to the particular market's quoting style when the two quoting styles differ. The order book for an item may include BBO data and data for other orders in the native quoting style, e.g., of the market, whether on an internal or external exchange, a preferred quoting style, or in multiple quoting styles together with indicia of the quoting style. A display showing a plurality of markets may display the markets side-by-side regardless of quoting style, optionally with indicia of the quoting style of each of the plurality of markets, as shown in FIG. 6. In the unitary quoting style display, e.g., the native quoting style or the preferred quoting style only displays, the system 100 may convert IBBO or other orders from non-compliant quoting styles to the required quoting style for display. The indicia of the quoting style may be a symbol, such as a price symbol, e.g., $, €, £, etc., a % symbol, e.g., % notional, % volatility, etc. Similarly, indicia of the quoting style may be formatting and highlighting, e.g., color-coded, in a format associated with a quoting style. Symbols, formatting, and highlighting may similarly be used to indicate the source of an order, e.g., whether internal or external.

The preferred quoting style may be user specific. That is, the system 100 may store a quoting style preference for at least one of a plurality of users indicating the quoting style the particular user prefers quotes in. The system 100 may then determine the quoting style preference for the particular user and interact with the user in the desired quoting style. In this instance, the system 100 may retrieve the user's quoting style preference, e.g., from the one or more databases that store user preferences, and display, e.g., the market or individual orders that make up the market for the item in the preferred quoting style at 240. The system may display an interface screen for users to place orders with the system 100 that includes at least one field for the user to specify the terms of an order in the preferred quoting style. The preferred quoting style may be group specific in that the preferred quoting style is applied to all users of the group.

In one embodiment, the trading system 100 is designed so that orders can be entered as a buy, sell, or buy and sell with a monetary value, amount, and monetary currency. Orders for exchange-listed securities may be entered in the external exchange's quoting style, price and size, with the currency defaulting to that on the exchange. Orders for securities quoted off-exchange OTC may similarly be entered in the external exchange's quoting style, price and size, with the currency defaulting to that on the exchange. Orders for securities quoted OTC may be entered in % notional and notional, % volatility and vega notional, etc., with the currency defaulting to that of underlying security from which it was derived as traded on its exchange. Orders for securities quoted "Quanto" or cross-currency OTC may be entered in % notional and notional, % volatility and vega notional, etc., with a specified quoting currency different from that of the underlying security from which it was derived as traded on its exchange. Orders for variance swap securities may be entered in % volatility and vega notional, with a specified quoting currency.

In at least one embodiment, orders and/or markets with price quoting styles are displayed with "$" or any appropriate currency symbol, those with % notional/volatility/other styles have a dynamic display of "%" and denominator (e.g. "notional", "volatility") next to them to support anything quoted in % or non-currency, and the quoting currency is displayed, whether Quanto or not, with various formatting and highlighting, e.g., color-coded if Quanto, or with a symbol indicating the underlying currency type. Orders may optionally be converted from one style to another for display purposes or otherwise, e.g., directly inline with other orders, as a popup, or on a secondary screen, by, e.g., using the spot rate of the underlying security to convert % notional to price style or in the reverse. Orders may also optionally be converted from Quanto to non-Quanto either for display purposes or otherwise, e.g., directly inline with other orders, as a popup, or on a secondary screen, by converting the price from one currency to another using the spot FX rate of the underlying security's currency/quoting currency.

Orders may optionally be displayed with various formatting, and highlighting, e.g., color-coded, associated with their quoting styles, if they're Quanto, whether listed or OTC, and whether they are an aggregate of a plurality of orders. Orders can be displayed all together with no apparent grouping, or may be optionally grouped and separated based on their quoting styles, if they are Quanto, and whether listed or OTC. Order formatting is preferably applied consistently for all orders that make up the depth of a market as well as the IBBO.

In this respect, in certain embodiments, when a user, such as a dealer, broker, trader, market maker, or customer, enters orders and works markets, the user can choose which quoting style the user wants to use as well as the quoting currency for each order and/or market. Orders may be added to each market using its quoting style and/or currency, or in the preferred style and/or currency. In the latter, the system 100 may convert the order from the preferred style and/or currency to the native style and/or currency of the relevant exchange. Users can choose to display all orders in a market or multiple markets in one quoting style, e.g., the preferred quoting style, which may be other than the native quoting style of the market, or all orders in a market and multiple markets in a plurality of quoting styles. Similarly, the preferred or native style/currency may be displayed for the order and/or the market in the order book and the conversion into the native style/currency to the preferred, respectively, may be displayed as a popup or separate window, e.g., when the user moves a mouse over the market or the order. In certain instances, the user may be required to select, e.g., click the market or the order for the conversion to be displayed in the popup or the separate window. For example, the market may be displayed in a % notional style and a price may be displayed in a popup that appears automatically when the user moves a pointer over the particular market or order in the display. Although orders in a market may be displayed in different styles and currencies, the system 100 preferably sorts the orders regardless of the quoting style to maintain a hierarchy based on price and/or size. Orders may be sorted dynamically to reflect real time changes in the spot rate of the underlying security with regard to % notional orders and/or the FX spot rate with regard to Quanto orders.

Referring to FIG. 6, an order book display 600 generally includes at least one or a plurality of markets for items 602. The order book 200 may include all of the markets in the system 100 or a subset thereof, such as markets filtered based on a query submitted by a user, e.g., for a particular item. In at least one embodiment, the order book 600 includes data identifying the item, such as a symbol 604 and a structure 606. A structure generally defines the terms of the order, such as the price, strike price, maturity, expiration, whether a sale (an offer), a buy (a bid), or a sale and a buy, a put, a call, a future, etc. For example, a structure for an equity derivative based on the ALV security may include a put option at 110 that expires in December 2007. The structure may include multiple components or legs, such as multiple options, e.g., a put and a call to make up a straddle, a strangle, etc. The order book 600 may also include data indicating the source or sources of depth for the market 608, such as an indication of whether the market is OTC only, listed only, or OTC that includes listed orders or listed that includes OTC orders. The order book 600 may also include data regarding the quoting style 610 and/or the quoting currency 612 of the market. The order book 600 preferably includes IBBO data 614 for each market.

Each individual data item may be highlighted and/or formatted as discussed above. For example, markets with % notional quoting styles may be displayed in fields with a first color background, e.g., with yellow fill. Similarly, Quanto markets may be displayed in fields with a second color background, e.g., with red fill. Fields for markets with the same best bid and best ask price may be displayed with a third color background, e.g., with green fill. The common price for best bid and best ask or at any other price level may generally indicate a potential internal cross that may present trading opportunities for users of the system. That is, matching prices may be viewed as an indication of where liquidity is pooling, e.g., in real-time, for an item being traded among the fragmented markets for the item. Markets with significantly unbalanced best bid and ask sizes may be formatted in bold. The extent of the imbalance sufficient to trigger the differential formatting may vary. For example, the best bid or ask sizes may be formatted in bold if the ratio of sizes is greater than 2:1 or some other predetermined amount. IBBO data that is an aggregate of a plurality of orders on a side may be formatted in italics. In one embodiment, bold-italic formatting indicates that best bid or best ask sizes in the BBO is a composite of two or more counter parties on the inside. Markets with external orders at the best bid or best ask price levels may be formatted with yet another color, as shown for the BAY December 2007 straggle, which has a bid side best price that originates from the Eurex exchange. The system 100 may allow users to sort or filter the markets in the order book 600 by one or more of symbol, structure, exchange indications, quoting style, Quanto or non-Quanto, quoting currency, bid size, bid price, ask price, ask size, IBBOs with same bid and ask, imbalance, etc.

In at least one embodiment, the system 100 allows a user to expand/retract individual markets in the order book to show market depth for internal orders, external orders, or a combination thereof. The terms "expand" and retract are used herein to indicate providing or showing additional data and less data, respectively. Thus, expand includes expanding a market or order(s) to show additional rows or columns, displaying a popup or separate window with additional data, etc. Similarly, retracting a market or order(s) includes removing or hiding data from the market or order(s) either by removing or hiding rows or columns, closing a popup or separate window, etc. The combination of markets may be thought of as a multi-market, e.g., an internal market and an external market, montage that includes orders from the internal exchange and orders from the external exchange for the particular market. A user's holdings or other data may also be displayed in the montage in relation to the internal exchange, the external exchange, or a combination thereof. Market depth and/or holdings or other data may be represented in relation to an X-Y axis, as shown in FIGS. 7-11, or in a Z-axis, as shown in FIGS. 12-14.

The system 100 may allow users to switch between displays so that any public or OTC exchange/montage or a subset/watch-list thereof forms the central column and act as primary through which everything else moves through its depth, expand markets to include or otherwise show certain classes of orders, holdings, and/or data, and retract markets to exclude or otherwise hide classes of orders, holdings and/or data. For example, the order book may include a central column or row that includes IBBO data, such as bid customer (first in time, largest size, compilation, etc.), bid size (aggregate if more than one), bid price, ask price, ask size (aggregate if more than one), ask customer data (first in time, largest size, compilation, etc.). The order book may show the IBBO in the middle of the chart with orders, such as bids, offers, quotes, and IOIs, below and above the IBBO. Users may therefore be able to switch, expand, and reduce the market to show the IBBO only, the IBBO with one or more buy side orders, such as bids, quotes, and IOIs, the IBBO with one or more sell side orders, such as offers, quotes, and IOIs, or the IBBO with both buy side and sell side orders. Internal market depth may further be expanded to show external market depth in relation to the internal market depth and/or user holdings in the particular market. The IBBO and the depths of the market may be expanded to show orders beyond the IBBO and/or holdings, as described herein, in the same interface screen, e.g., directly inline or offset with the other data, e.g., horizontally or vertically, in a separate window or popup of the same interface screen, or a separate interface screen.

In at least one embodiment, depth orders are rated for quality and/or tradability. Quality or tradability may generally differ between different types of orders and at times between orders of the same type. Generally, firm orders have a greater tradability than non-firm orders. For example, bids and orders may be deemed more tradable than IOIs. Similarly, firm bids or offers that are not subject to cancellation may be deemed to have a greater tradability than other bids and offers, and IOIs with more trading variables specified may be deemed more tradable than IOIs with less trading variables specified. Moreover, certain trading variables may provide greater assurance as to tradability and thus may distinguish IOIs based on the inclusion or exclusion thereof. For example, IOIs with a price may be deemed to have greater tradability than IOIs with a size specified. Tradability may also be based on time. That is, newer orders may be deemed to have a greater tradability than older orders. For example, IOIs placed in the most recent trading day may be deemed more tradable than IOIs placed days prior. Quality and/or tradability may be represented on any sale, linear on otherwise. For example, quality and/or tradability may be represented on a numerical scale, e.g., 1 to 10, with larger numbers indicating better quality or tradability than smaller numbers. 0 may be used to indicate uninterested. A sample tradability classification scheme is shown in Table A below.

Tradability may also be based on historic data for the particular user submitting the order. For example, bids and offers from a user having a history of trading the subject item at the size specified in the bid/offer may be elevated to a higher level, e.g., from a 2 to one. Similarly, the lack of a trading history and frequent cancellations may lower the tradability score. It is understood that any classification scheme may be implemented to indicate the quality or tradability of an order and is thus not limited to any one particular scheme. Tradability may be displayed via additional columns/rows and/or with distinguishing formatting/highlighting (e.g., color-coding) to clearly indicate tradability. Moreover, orders may be sorted based on tradability, in addition to price, size, and time, or a combination thereof.

TABLE A

| Score | Order |
|---|---|
| 10 | Firm Orders |
| 9 | Bids, Offers |
| 8 | Quotes |
| 7 | IOIs w/Name, Side, and Size |
| 6 | IOIs w/1 Variable Missing |
| 5 | IOI w/Name and Side |
| 4 | IOIs w/2 Variable Missing |
| 3 | IOIs w/Name Only |
| 2 | IOIs w/3 Variable Missing |
| 1 | IOI w/No Variables |

A user, such as a dealer/broker, can display their internalized market/internal exchange in an IBBO and expandable depth format side-by-side with another public exchange/montage where the public exchange maps against the securities/structures in the internal exchange and their depths continuously line up at coincident levels as the exchanges update. This is so both when the external exchange/montage directly supports the structure type of the item in the internalized market/internal exchange and when it only supports component legs of the structure type of the item in the internalized market/internal exchange, in which case it will indirectly support such structure types of the internalized market/internal exchange via synthetically using the component legs available on the external exchange/montage to simulate the structure type as if supported natively. Any exchange/montage can be chosen as the primary column to display overall BBO. As many additional exchanges/montages can be compared as screen real estate allows to, e.g., add columns for them. Matching rows may indicate crossing opportunities to trade at the same price and can be highlighted to clearly indicate when trading conditions are favorable. As price and size move across the exchanges, clear trading patterns should emerge in real-time.

A trader may also display multiple liquidity pools/exchanges/montages in BBO and expandable depth format side-by-side with other liquidity pools/exchanges/montages where watch list securities/structures and their depths continuously line up at coincident levels as the exchanges update. Matching rows may indicate where liquidity is pooling in real-time among the fragmented markets and where best price at desired size can be obtained.

Referring to FIG. 7, in one embodiment, users are able to expand and/or retract the order book 300 to show/hide market depth for each of the markets shown therein. For example, order book 300 may be expanded to show a first level of external market depth, e.g., an external bid price and bid size, 304, and an external ask price and ask size 306, along with the IBBO data. Expansion may occur horizontally by adding relevant columns to the order book 300, as shown, or with a popup or additional window. The first level of external market depth may be displayed on either side of and in the same row as the IBBO data for the particular expanded market. As can be seen, the market for the BP straddle includes an IBBO with best bid and ask prices at 65 and a best bid size of 200 and a best ask size of 500. The first level of external market depth, e.g., the external best-bid and best-offer or EBBO, includes at least one best bid (EBB) at 61 for 100 units and at least one best ask (EBO) at 66 for 200 units. The EBB and the EBO may be an aggregate of a plurality of orders at the best price or prices.

The order book 300 may include order origin data, such as the name or ID of the user associated with the order. The ID may further indicate whether the order originates from an exchange, a market maker, customer, anonymous, or other source. If more than one customer has submitted orders at a particular price level, e.g., at the IBBO or any other price level, then the bid/ask customer field may include the ID for the first customer in time, the customer with the largest order, or multiple (composite) customers on each side. The system 100 may differentiate price levels having multiple customer orders with formatting/highlighting to indicate as such. The system 100 may further make details available if there is more than one customer associated with a field by displaying the additional customer data in, e.g., a popup, such as hover popup, popup menu, etc. The origin data may be displayed in an expansion that adds one or more columns to the order book as shown, in a popup, or separate window.

Referring to FIG. 8, individual markets in the order book 300 may further be expanded to show external depth beyond the IBBO data and/or beyond the internal depth. Expanding the market in this respect may occur vertically in which instance internal orders for the particular expanded market may be displayed in rows added above, below, or both relative to the IBBO. Orders relative to the BBO, such as the IBBO or EBBO, may be displayed sorted either converging, i.e., bids in descending order by price below and asks in descending order by price above the IBBO, as shown in FIGS. 8-9, or side-by-side, i.e., bids in descending order by price and asks in ascending order by price below the IBBO, as shown in FIGS. 10-11. Bids and asks at the same price may further be sorted based on a first-in-time priority and/or greater-size priority. As can be seen, the depth of the IBBO on the bid side includes at least one order from CstA and on the ask side includes at least one order from CstB and at least one quote from market maker mmX. Depth beyond the IBBO on the bid side includes quotes from mmX at 63 and mmY at 60 and on the ask side from mmY at 67. Depth may similarly be expanded to show internal and external depth expanded for the BP market beyond the IBBO, as shown in FIGS. 8 and 10, and EBBO, as shown in FIGS. 9 and 11, repressively. The IBBO and/or EBBO data may be set as the default data displayed that are expandable to show depth beyond the respective BBO data. As such, orders or groups of orders from each exchange may be expanded at least once, e.g., from a first or the BBO state to an expanded state.

Although expansion is described above in relation to an external and an internal exchange, the order book may be applied to multiple external, internal, OTC, and/or public exchanges, ECNs, etc., and the order book may be expanded to show the depth and BBO data for each exchange, such as a first, second, third, etc., external exchange, with additional columns or rows, popups, separate windows, etc., for each exchange. The order book may be applied to any OTC exchange, public exchange, securities, and/or structures that map against the markets available in the internal exchange so that orders, such as bids, offers, quotes, IOIs, etc., from other exchanges may be displayed at coincident price levels with orders from the internal exchange, as shown in FIGS. 6-11. This is so both when the external exchange/montage directly supports the structure type of the item in the internalized market/internal exchange and when it only supports component legs of the structure type of the item in the internalized market/internal exchange, in which case it will indirectly support such structure types of the internalized market/internal exchange via synthetically using the component legs available on the external exchange/montage to simulate the structure type as if supported natively.

The displays discussed herein are not limited to combining orders for markets on multiple exchanges. Rather, the displays may be applied to combine one or more exchanges with other data. For example, user or customer holdings may also be shown in a separate expansion, which includes fields for size and cost basis for one or more lots held by the user or customer. The holding data may be displayed at coincident price levels with orders in a market on at least one exchange. Additionally, data from multiple exchanges may be combined in is a single expansion. For example, orders from a plurality of external exchanges may be combined in one or more columns displayed along side a column for the internal exchange with an expandable BBO as discussed herein.

Order data for orders making up the depth of a market is preferably presented in real-time. That is, the system 100 may update the order data in the order book to reflect real time changes in the market for the one or more items, which may include refreshing the interface screen and/or resorting the data therein periodically, such as when orders are added or removed from the market for the one or more items as electronic feeds allow.

Referring to FIG. 12, in at least one embodiment external orders are shown in the order book in a Z-axis, e.g., inline with or in the same direction as that of internal market orders. That is, when expanded beyond the IBBO the order book for an item may include internal orders and externals orders in the same column, as shown, or row. The BBO and the expandable depth for a external or public exchange may be displayed overlaid on the internal order's column with distinguishing formatting and/or highlighting, e.g., color-coding, hover popup. Expansion may occur both in the X-Y and Z-axis. That is, internal and external markets may be displayed in a Z-axis with IOIs, holdings, and other data, in an X-Y expansion, e.g., in additional column coincident with the Z-axis display. Any combination of internal and external/public exchanges/montages can be added together to each set of columns to provide the display desired by the user.

As can be seen, the BP June 2007 600 straddle may be expanded once beyond the IBBO to include the external best ask (EBO) (200 at 66 from the Liffe exchange) and the external best bid (EBB)(100 at 61 from the Liffe exchange). The EBB may further be expanded as shown in FIG. 9 to show external depth beyond the EBB (500 at 61, 400 at 59, and 1000 at 58 from the Liffe exchange). As in the embodiments discussed above, the markets may be displayed in a converging or side-by-side arrangement as shown in FIGS. 8-9 and 10-11, respectively. Further, highlighting and/or formatting may be used to distinguish external and internal orders in the row or column. For example, external orders may be included in fields in a first color and internal orders may be included in fields in a second color. Additional external exchanges may be displayed in a third, forth, etc. color. The exchange name may also appear in the customer field that would normally show the identity of the customer in the internal exchange. The fields may also be distinguished further with fill patterns, such as dots, hash marks, grids, etc.

Orders may cross the IBBO level. For example, an offer for 10 at 64 BP June 2007 straddle may cross the IBBO of 65. In an automated trading system, crossing orders may be transformed to a market order and executed automatically at the IBBO, e.g., at 65. In manual trading system, the crossing order may be displayed past the IBBO until another user accepts the bid or offer by hitting the bid or taking the offer.

A dealer/broker can therefore display their internalized market/internal exchange in an IBBO and expandable depth format in a single stacked/overlaid column with another public exchange/montage where the public exchange maps against the securities/structures in the internal exchange and their depths continuously line up and overlap at coincident levels as the exchanges update. Any exchange/montage can be selected as primary through whose depth the BBOs of the other exchanges/montages move. As many additional exchanges/montages can be compared as distinguishing formatting/highlighting allows. Overlapping rows indicate crossing opportunities to trade at the same price and can be highlighted to clearly indicate when trading conditions are favorable. As price and size shift across the exchanges on top of the other, clear trading patterns should emerge in real-time.

A trader can also display multiple liquidity pools/exchanges/montages in BBO and expandable depth format in a single stacked/overlaid column with other liquidity pools/exchanges/montages where watch list securities/structures and their depths continuously line up and overlap at coincident levels as the exchanges update. Overlapping rows indicate where liquidity is pooling in real-time amongst all the fragmented markets and where best price at desired size can be obtained.

In at least one embodiment, the order book may use formatting and/or highlighting, as discussed above, to indicate the quality of the individual orders. For example, formatting and highlighting may be used to delineate between orders of varying types, such as orders having indicative prices (IOIs), stale quotes, etc. For example, orders older than two hours or some other predetermined time may be color coded to indicate that the order, such as an IOI, may be stale. Similarly, an order having a price that has moved away from the IBBO prices greater than a predetermined amount, e.g., 10%, may also be stale.

Individual items of order data in the order book may be selectable for a user to initiation a trade. That is, users may click, e.g., double click, on a price or size of their own order in the order book or of the BBO to trade at the BBO if already there. That is, clicking on their order converts the order to a market order which may be executed at the BBO price. When a user clicks on the BBO, the user is simply submitting a market order. When a user selects the size, their order is modified to match the size of the selected order.

Users may also be able to click on another order and execute a trade with the selected order.

In at least one embodiment, users may be able to grab their order an place it in between any of the orders in the market or drop the order into another order. When dropped between orders, the price of the order will be converted to a price within the spread between the two orders. The price may be, for example, one or more ticks from the best price in the spread, an average between the spread prices, etc. When the order is dropped into an order on the same side, the order being dropped may be converted to match the price and/or the size of the existing order that the order is being dropped into. If the order is dropped into an order on the opposite side, the order being dropped may be converted to match the price and/or size of the existing order and execute a trade therewith. Matching can be either automatic, manually prompted, subject to confirmation, or a combination thereof.

As such, a user can, in certain embodiments, display markets in an internal exchange in an IBBO format with expandable depth together, e.g., side-by-side in separate columns or stacked/overlaid in the same column, with orders from an external exchange. Orders from the external exchange generally map against the items, e.g., the securities and/or structures, having markets in the internal exchange. The depth or depths between at least two exchanges preferably continuously line up at coincident levels as the exchanges update. Users may choose any exchange/montage as the primary column or row to display overall BBO. Matching rows indicate crossing opportunities to trade at the same price and can be highlighted to clearly indicate when trading conditions are favorable. As price and size move across the exchanges, clear trading patterns should emerge in real-time.

In at least one embodiment, the system 100 integrates its trading with external accounting data to provide front and back office personnel access to both types of data. In one embodiment, the trading system 100 is generally wholly separate from any accounting system. Unlike cleared trades, commissions for give-up trades are billed to the customer. Thus, after the trade is made the commission for the give-up trade must be invoiced and payment collected. Some cleared or principal trades where, e.g., the brokerage can't be incorporated into the price of the trade, may be invoiced as well. Moreover, trades both cleared and give-up may also be disputed. All of these processes happen outside the trading system that the front office uses, yet the back office accounting personnel will often call on the front office personnel reactively to contact their customers to assist in collections or disputes.

Figure 15:
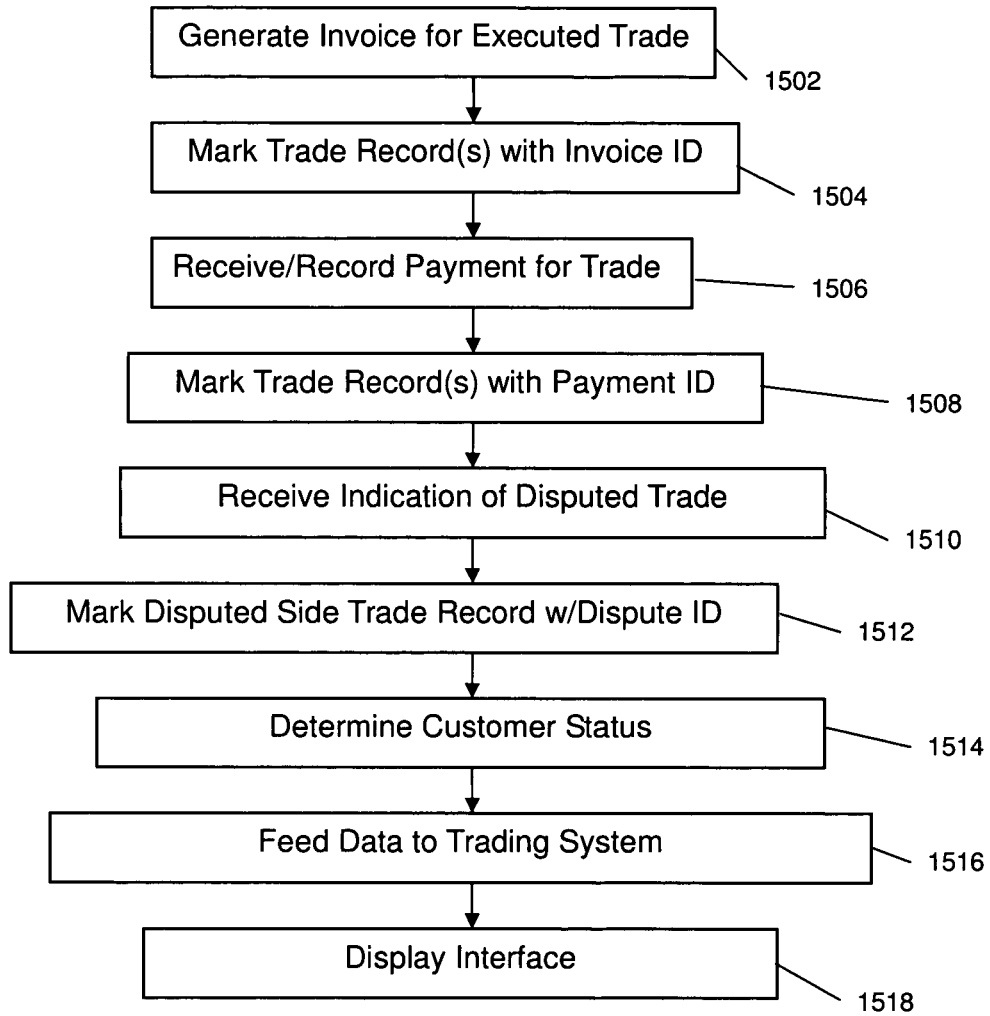

Referring to FIG. 15, in one embodiment, as the back office system generates periodic, e.g., monthly, invoices at 1502, it marks one or each side of a trade in the system 100 at 1504 with the invoice ID and optionally invoice date, or some other indication that will or can be used to indicate to the front office personnel that the trade has been billed. As the back office system records payments and assigns payments to trades at 1506, the system marks at 1508 the record or records associated with the trade, e.g., each side of a trade, with the payment ID and optionally payment date, or some other indication that will indicate to the front office personnel that the trade has been paid. As the back office system flags invoiced trades as disputed at 1510, it marks the disputed side of a trade at 1512 with a dispute ID and optionally a dispute date and reason text, or some other indication that will indicate to the front-office personnel that the trade has been disputed and why. The back office system may also at 1514 calculate or otherwise determine customer payment status, e.g., current, past due, and rating, and feed at 1516 this information associated with each customer to at least one database, such as a customer master database. Adverse status/rating or any other of the above can be displayed at 1518 in an interface generated by the trading system with various formatting and highlighting, e.g., color-coded, of the customer ID wherever it is displayed for the broker to act on. For example, an interface screen may be displayed which includes a list of trades associated with a user, e.g., a trader or broker, with an indication of the status of the trade, e.g., whether invoiced, disputed, paid, overdue, etc., and any relevant information associated with the status.

In this respect, brokers or other users can easily see if any trade has been invoiced and/or paid by simply looking for the invoice and/or payment IDs on any of their trades. Disputed trades are immediately flagged and raised by the back office system to the trading system so that brokers may facilitate resolution. Brokers can now see overall customer payment status/rating during trading and use it to help decide if they want to actively trade with individual customers. The adverse status or rating may further be used in identifying potential counter parties. That is, potential counter parties with adverse ratings may be blocked from the list altogether or moved down the list, e.g., based on the level of the adverse rating.

Trading relationships between a dealer/broker and their customers may involve a negotiated commission rate that frequently involves a variety of factors including underlying security price range (for derivatives) and a leg factor or factors (for multi-leg trades), as well as a preferred commission currency which may differ from a security's underlying currency. In at least one embodiment, the system 100 includes a commission engine that flexibly calculates commissions for these instances.

Figure 16:
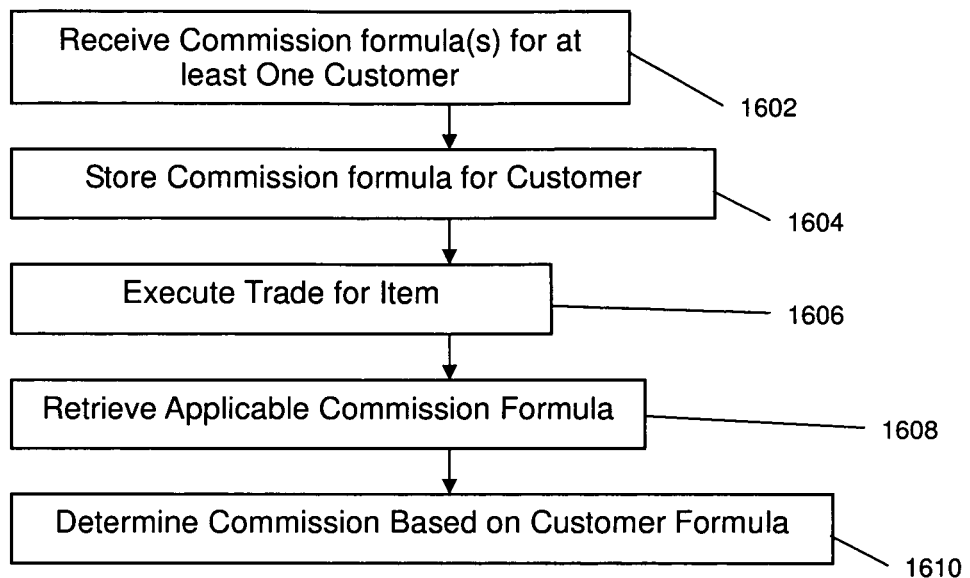

Referring to FIG. 16. in one embodiment, the system 100 receives at 1602 and stores at 1604, for at least one customer, one or more commission formulas, which includes at least one variable, such as a per contract rate, a basis points rate, a % notional commission rate, a hedge commission rate, and a default multi-leg trades long/short per leg commission billing factor(s). The commission formulas/variables may be stored in records associated with the customer master database. These rates and factors may be generic or based on a range of underlying security prices. That is, a customer may have a commission formula that is applicable for an item at a first range of prices and another formula applicable for the same item at a second range of prices. Additionally, the customer may have a commission formula that is applicable for one item and another formula for another item. The system 100 may also store a standard commission currency for each customer.

The system 100 may therefore retrieve the one or more commission formulas/variables and/or the commission currency at 1608 in computing the commission for a trade executed at 1606. The trading system commission engine may thereafter calculate a trade's commission at 1610 in the underlying or preferred currency based on the applicable formula/specified rates associated with the customer. Commissions may be FX-adjusted to the P&L currency using the most recent closing FX rate, a spot FX rate, such as at the execution of the trade, and then recalculated once the then current day's closing FX rate is received.

A dealer/broker may therefore enter in and maintain each customer's commission rates and currency so that when their trades are booked the commission may be calculated automatically and accurately. The customer can be billed in their desired currency, but the trade's true P&L may be calculated based on an FX adjustment to a uniform P&L currency.

Customers that trade multi-leg instruments, or have multiple fills or counter-trades often desire that their trade confirmations represent the whole of the trade rather than the pieces individually. In at least one embodiment, the system 100 includes a confirmation engine that aggregates a plurality of trade confirmations for each leg of a multi-leg instrument or multiple fills in a related transactions into a single confirmation. The system 100 may then generate and transmit confirmations to customers based on the customer's communication preferences.

Figure 17:
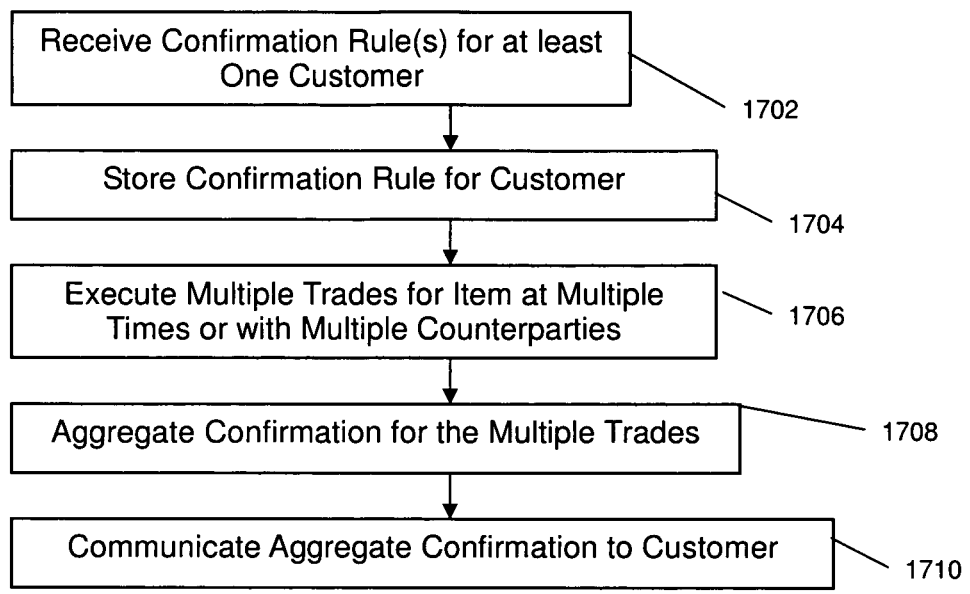

Referring to FIG. 17, in at least one embodiment, the confirmation engine includes business rules to aggregate confirmations for multiple legs, hedges, multiple fills, multiple trades, etc., when a customer trades with a plurality of counter parties or otherwise. In this instance, the system 100 receives a confirmation rule at 1702 from a user, e.g., a customer, and stores the confirmation rule at 1704. The system 100 may also use a template that includes metadata fields to override how some data is presented and optionally allow users to customize confirmations. The template may also be used to force aggregate confirmations for some trades that have been traded on different exchanges, e.g., on an internal exchange and at least one external exchange. In any event, the system 100 receives at least one order from a user, as discussed above. The at least one order may be a single order for an item that may be executed with multiple counter side orders, e.g., multiple fills.

The system 100 may execute multiple trades for the item or items at 1706 and thereafter aggregate the confirmations for the multiple trades in a single confirmation at 1708, e.g., holding the confirmation for a prior order until a later order is executed and the two confirmations combined in a single confirmation, according to the confirmation rule associated with the user. A template may generally be stored for each customer, in which instance, the confirmation engine determines the correct template and transmits to the customer a trade confirmation based thereon at 1710. Templates may be buy or ask side specific and trade type, e.g., listed, OTC, quanto OTC, hedge type, specific. The confirmation engine may further timestamp each side of each trade when the post-trade confirmation was transmitted.

Therefore, a dealer/broker may enter in and maintain each customer's confirm communications preferences and utilize predefined business logic and templates to aggregate legs/fills/trades and generate confirmations based thereon. Additional metadata in the trade details may be used to customize and override trade data presented on the confirmation as well as force aggregate some trades. The confirmation may then be transmitted to the customer according to their individual communication preferences. In one embodiment, customer records in the Customer Master database define communications addresses and preferences (e.g., fax, e-mail, etc.) for confirmations, which may be retrieved and used to automatically communicate the confirmation to the customer.

Single-leg trades are relatively straightforward in that the trade notional is identical to the leg notional. Multi-leg trades can have two or more legs that make up the whole trade each having a notional that must add up to the overall notional of the trade. In at least one embodiment, the system provides a multi-leg notional split checker that generally calculates notional in real-time during pre-trade pairing/booking, e.g., while the user prepares the multi-leg order, and post-trade adjustment at the trade level and at the leg/hedge level. That is, during both pre-trade pairing/booking and post-trade adjustment, net trade notional (size×multiplier×price) is calculated and displayed. During both pre-trade pairing/booking and post-trade adjustment, the sum of the trade's individual legs' notionals and hedge notional is calculated and displayed. During both pre-trade pairing/booking and post-trade adjustment the difference between net and sum may be calculated and displayed optionally with a variety of additional distinguishing formatting/highlighting to clearly indicate that a multi-leg trade's size and price split is correctly or incorrectly specified, as the case may be.

As size and price for each leg and any hedge are entered during pre-trade pairing/booking and edited during post-trade adjustment, overall trade notional and summed notional are calculated, compared, and displayed in real-time to eliminate any ambiguity and error in the individual leg/hedge sizes and prices Delta measures a derivative security's price sensitivity relative to the movement in its underlying security. Delta can be used in a derivatives transaction to represent different quantities buy/sell of the underlying security to affect various trading strategies. Ordinarily, two different buys/sells at the same price on the same derivative are only equivalent if they have the same spot (in the underlying) and delta but will differ in value if the spot and delta are different. In at least one embodiment, the system 100 includes an order/quote engine for derivatives that automatically delta adjusts bids and asks based on order/quote spot and delta to normalize the order's individual price in the depth and resulting IBBO so individual orders/quotes automatically factor in spot and delta. In one embodiment, the system 100 calculates delta adjusted bid and/or ask for all orders/quotes in a market by multiplying the difference between the overall market's spot and the bid's/ask's spot times time the order/quotes delta divided by 100 and adding that to the bid/ask. The delta adjusted bid/ask may therefore be displayed on all orders/quotes that comprise a market to calculate its IBBO and sort orders outside the IBBO based on the delta adjustment.

Therefore, when a user enters orders and works markets, the user can choose to enter a spot and delta for a specific order/quote in a market that differs from the rest in the other orders/quotes in that market and then have the delta-adjusted bid/ask calculated so that it can be represented alongside the other orders/quotes. Once the buys and sells are delta adjusted then the trading prices can be compared without regard to any hedging component of the trade.

For a given market in a derivative, each of the constituent orders (w/bid, ask, or bid & ask, can also just be a quote or IOI) can have its own spot and delta, and the actual underlying of the derivative has its spot (e.g., the stock's spot price). Each order may, in certain embodiments, be delta- and spot-adjusted atomically by calculating the difference between the overall market's spot and the order's spot times the order's delta divided by 100 and adding that to the order's price (bid, ask, or both). So each constituent order has its regular set of prices and delta/spot-adjusted prices so that the market's BBO and depth can be ordered by regular or normalized prices.

In one aspect, a business process is provided for managing and trading shared order book as an internal exchange. That is, a dealing/broking business process is provided whereby dealer's/broker's customers' indications/indicative prices (IOIs) and actual orders, both initial and resulting from working the initial indication/order, are pooled together in a shared order book grouped by the initiating indications/orders and managed as an internal manual/semi-automated/automated exchange. In this respect, markets in the internal exchange, consist of an initial indication's/order's structure and metadata, has depth, consisting of the resulting private indications/orders, new matching orders, and private/public quotes, and an inside market/IBBO (internal BBO), consisting of the best bid and ask, the aggregate best bid and ask sizes, and the first/largest/composite customers on the best bid and ask.

In one embodiment, every initial customer indication/order becomes an internal market with that indication's/order's security(ies) and structure. A customer indication is an indicative price or indication of interest (IOI) which expresses their interest in an order but is not an actual order. It may contain all elements of an order or only indicate the security. As the internal market is worked, all resulting customer orders and structure (i.e., lack buy/sell side, price, and size), or anywhere in between and indications are grouped with the initiating indication/order and constitute the internal market's depth. Depth may optionally include no size/price for those customers who aren't interested. All depth may optionally be ranked with a qualitative factor for each item (e.g., 0-10, 0 not interested, 1 interested to 10 firm market order). Any new customer indications/orders that match an existing customer indication/order may be grouped with the existing customer indication/order.

Every internal market may have a calculated inside market/IBBO (internal BBO) that aggregates the best priced buy and sell orders/quotes together (i.e., excluding indications) to get the best bid, total best bid size, best ask, and total best ask size. The first, largest, or a composite customer on each side is listed as the inside buyer and seller, with further details available if there is more then one customer on the inside. An indication can't constitute the BBO because it isn't an actual order/quote. For markets listed on a public exchange or ECN (i.e., not private or OTC), the public exchange's quotes can be an internal market's IBBO on the internal exchange and would be viewed as just another component of that internal market's depth (though not actually a component the internal exchange). This is so both when the public exchange directly supports the structure type of the item in the internal market and when it only supports component legs of the structure type of the item in the internal market, in which case it will indirectly support such structure types of the internal market via synthetically using the component legs available on the public exchange to simulate the structure type as if supported natively. As each inside market's orders are filled, those orders are removed from the IBBO and depth and added to a running calculation of that market's total traded, last trade price, and average trade price. Dealers/brokers may revise or cancel any existing indication/order, including revising an indication to be an order or an order in an internal market to hit that market's IBBO. Dealers/brokers may work the indications/orders in a manual/semi-automated/automated manner as indication/order, price quality, and liquidity allow. All the dealer's/broker's internal markets together comprise their internal exchange. Internal exchange data and statistics can be used to provide quick markets to customers, may eventually become more then internal (e.g., ECN), and in the abstract may have a value all their own (e.g., market data, valuation data).

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A method comprising:

receiving, by at least one processor communicatively coupled with at least one memory device, in real time a plurality of orders for an item, over a communication network, from computing devices associated with a plurality of internal users;

receiving, by the at least one processor, in real time a plurality of orders for the item, over the communication network, from computing devices associated with a plurality of external users;

determining, by the at least one processor, a best bid and a best offer from the plurality of the orders from the plurality of internal users and from the plurality of the orders from the plurality of the external users;

directing, by the at least one processor, over the communication network, in real time response to receiving the real-time plurality of orders from the computing devices associated respectively with the plurality of internal uses and external users, an interface screen to be displayed at a user computing device, the interface screen comprising a shared order book for the item that comprises:

a listing of the orders from the plurality of internal users and the plurality of external users sorted based at least by price, the shared order book arranged in a set of bid side columns and a set of ask side columns, each of the set of columns comprising at least one price column and at least one size column, and at least one column indicating a source of at least one of each of an order from an internal user and an order for an external user, wherein the interface screen is operable for a user to drag a first order of the listing of orders displayed on the interface screen and drop the first order on the interface screen in relation to a given order of the listing orders displayed on the interface screen;

receiving, by the at least one processor, over the communication network, an indication of a location on the interface screen at which the first order is dropped based on an operation by the user to drag and drop the first order; and automatically responsive to receiving the indication of the location, by the at least one processor, determining whether the location is between first and second given orders displayed on the interface screen or includes a price of another order displayed on the interface screen, when the location is determined to include the price of the another order, changing a price of the first order into the price of the another order and executing, over the communication network, a trade between the first order and the another order, and when the location is determined to be between the first and second given orders, changing the price of the first order to a price within a spread between the first and second given orders and executing, over the communication network, a trade between the first order and a matched order at the price within the spread.

2. The method of claim 1, wherein at least one of the plurality of orders comprise an indication of interest and wherein the indication of interest is maintained in the shared order book coincident with other orders.

3. The method of claim 2, wherein the shared order book comprises a first column for internal user indications and at least a second column for external user indications.

4. The method of claim 1, wherein the shared order book comprises a first column for internal user price and a second column for external user prices.

5. The method of claim 1, wherein:

the shared order book comprises at least one of the best bid and the best offer from the plurality of orders, the at least one of the best bid and the best offer from the plurality of orders comprise a plurality of orders; and wherein the at least one of the best bid and the best offer comprises an aggregate of sizes of the plurality of orders at the at least one of a best bid price and a best offer price.

6. The method of claim 1, wherein the source of the at least one of the best bid and offer comprises an external exchange and wherein the indication of the source comprises an identification associated with the external exchange.

7. The method of claim 6, wherein the source of at least one other of the best bid or offer comprises an internal user, the method further comprising receiving a counter side order from another internal user that is executable against at least one of the best bid and the best offer, and executing by default the counter side order first against the order from the internal user and then against the order from the external exchange.

8. The method of claim 1, wherein the shared order book comprises at least one element for a user to expand at least one of internal market depth and external market depth.

9. The method of claim 1, wherein the shared order book comprises an indication that distinguishes price type of at least one of orders, requests for quotes, quotes, and indications of interest.

* * * * *